United States Patent [19]

Hillis

[11] Patent Number: 5,129,077
[45] Date of Patent: Jul. 7, 1992

[54] SYSTEM FOR PARTITIONING A MASSIVELY PARALLEL COMPUTER

[75] Inventor: W. Daniel Hillis, Cambridge, Mass.

[73] Assignee: Thinking Machines Corporation, Cambridge, Mass.

[21] Appl. No.: 464,681

[22] Filed: Jan. 16, 1990

Related U.S. Application Data

[63] Continuation of Ser. No. 323,173, Mar. 15, 1989, abandoned, which is a continuation of Ser. No. 902,290, Aug. 29, 1986, abandoned, and a continuation-in-part of Ser. No. 184,739, Jun. 27, 1988, Pat. No. 5,008,815, which is a continuation of Ser. No. 499,474, May 31, 1983, Pat. No. 4,814,973.

[51] Int. Cl.⁵ .............................................. G06F 13/00
[52] U.S. Cl. .............................. 395/500; 364/DIG. 1; 364/228.2; 364/229; 364/230; 364/232.1; 364/239; 364/240; 364/241.9
[58] Field of Search ... 364/200 MS File, 900 MS File

[56] References Cited

U.S. PATENT DOCUMENTS

| | | | |
|---|---|---|---|
| 4,247,892 | 1/1981 | Lawrence | 364/200 |
| 4,523,273 | 6/1985 | Adams, III et al. | 364/200 |
| 4,598,400 | 7/1986 | Hillis | 370/60 |
| 4,639,857 | 1/1987 | McCanny et al. | 364/200 |
| 4,644,496 | 2/1987 | Andrews | 364/900 |
| 4,722,084 | 1/1988 | Morton | 371/9 |
| 4,733,353 | 3/1988 | Jaswa | 364/200 |
| 4,748,585 | 5/1988 | Chiarulli et al. | 364/900 |

OTHER PUBLICATIONS

Ian R. Greenshields, "Dynamically Reconfigurable, Vector-Slice Processor", IEEE Proceedings, vol. 129, Pt. E, No. 5 (Sep. 1982), pp. 207-215.

Lin et al."Reconfiguration Procedures for a Polymorphic and Partitionable Multiprocessor," IEEE Transactions on Computers, vol. C-35, No. 10 (Oct. 1986), pp. 910-915.

Tsutomu Hoshino "An Invitation to the World of PAX," IEEE Computer, (May 1986), pp. 68-80, 0018-9162/86/0500-0068$01.00.

Charles L. Seitz, "The Cosmic Cube", Communications of the ACM, vol. 28, No. 1 (Jan. 1985), pp. 22-33.

(List continued on next page.)

Primary Examiner—Thomas C. Lee
Assistant Examiner—Robert B. Harrell
Attorney, Agent, or Firm—Pennie & Edmonds

[57] ABSTRACT

A method and apparatus are described for improving the utilization of a parallel computer by allocating the resources of the parallel computer among a large number of users. A parallel computer is subdivided among a large number of users to meet the requirements of a multiplicity of databases and programs that are run simultaneously on the computer. This is accomplished by dividing the parallel computer into a plurality of processor arrays, each of which can be used independently of the others. This division is made dynamically in the sense that the division can readily be altered and indeed in a time sharing environment may be altered between two successive time slots of the frame. Further, the parallel computer is organized so as to permit the simulation of additional parallel processors by each physical processor in the array and to provide for communication among the simulated parallel processors. These simulated processors may also be stored, in virtual memory. As a result of this design, it is possible to build a parallel computer with a number of physical processors on the order of 1,000,000 and a number of simulated processors on the order of 1,000,000,000,000. Moreover, since the computer can be dynamically reconfigured into a plurality of independent processor arrays, a device this size can be shared by a large number of users with each user operating on only a portion of the entire computer having a capacity appropriate for the problem then being addressed.

36 Claims, 12 Drawing Sheets

OTHER PUBLICATIONS

Preparata et al. "The Cube-Connected Cycles: A Versatile Network for Parallel Computation." Communications of the ACM, vol. 24, No. 5 (May 1981), pp. 300-309.

Hillis W. D. "Chapter 4 The Prototype." In: *The Connection Machine* (Massachusetts, MIT, 1985), pp. 71-90, 145-172.

NCR45CG72 GAPP Application Note No. 3, Ohio, NCR Corporation, 1985, pp. 1-23.

NCR45CG72, Ohio, NCR Corporation, 1984, pp. 1-12.

Hillis, W. D. "The Connection Machine", Massachusetts, MIT (1981), pp. 1-21, 23-29. A.I. Memo No. 646.

Kenneth E. Batcher "Design of a Massively Parallel Processor." IEEE Transactions on Computers, vol. C-29, No. 9 (Sep. 1980), pp. 836-840.

Asbury et al. "Concurrent Computers Ideal for Inherently Parallel Problems." Computer Design, (Sep. 1, 1985), pp. 99-102, 104, 106-107.

ized and interconnected in two geometries. One geometry is a conventional two-dimensional grid pattern in which the processor/memories are organized in a rectangular array and connected to their four nearest neighbors in the array. For convenience, the sides of this array are identified as NORTH, EAST, SOUTH and WEST. To connect each processor/memory to its four nearest neighbors, the individual processor/memories are connected by electrical conductors between adjacent processor/memories in each row and each column of the grid.

SYSTEM FOR PARTITIONING A MASSIVELY PARALLEL COMPUTER

CROSS REFERENCE TO RELATED APPLICATIONS

This is a continuation of Application Ser. No. 07/323,173, filed Mar. 15, 1989, now abandoned, which is a continuation of Application Ser. No. 06/902,290, now abandoned, filed Aug. 29, 1986 and is also a continuation-in-part of Application Ser. No. 07/184,739, now U.S. Pat. No. 5,008,815, filed Jun. 27, 1988, which is a continuation of Application Ser. No. 06/499,474, now U.S. Pat. 4,814,973, filed May 31, 1983.

Related applications are "Parallel Processor/Memory Circuit," Ser. No. 499,471, now U.S. Pat. No. 4,709,324, filed May 31, 1983, now U.S. Pat. No. 4,709,327 "Method and Apparatus for Routing Message Packets," Ser. No. 671,835, filed Nov. 15, 1984, now U.S. Pat. No. 4,598,400, "Method and Apparatus for Interconnecting Processors in a Hyper-Dimensional Array," Ser. No. 740,943, filed May 31, 1985, now U.S. Pat. No. 4,805,091, and "Method of Simulating Additional Processors in an SIMD Parallel Processor Array," Ser. No. 832,913, filed Feb. 24, 1986, now U.S. Pat. No. 773,038, all of which are incorporated herein by reference.

BACKGROUND OF THE INVENTION

This relates to massively parallel processors and, in particular, to improvements in the methods and apparatus first disclosed in the above-referenced '471 and '474 applications and '400 patent.

As shown in FIG. 1A of the '400 patent which is reproduced in FIG. 1, the computer system of those disclosures comprises a mainframe computer 10, a microcontroller 20, an array of parallel processing integrated circuits 35, a data source 40, a first buffer and multiplexer/demultiplexer 50, first, second,, third and fourth bidirectional bus control circuits 60, 65, 70, 75, a second buffer and multiplexer/demultiplexer 80, and a data sink 90. Mainframe computer 10 may be a suitably programmed commercially available general purpose computer such as a VAX (TM) computer manufactured by Digital Equipment Corp. Microcontroller 20 is an instruction sequencer of conventional design for generating a sequence of instructions that are applied to array 30 by means of a thirty-two bit parallel bus 22. Microcontroller 20 receives from array 30 a signal on line 26. This signal is a general purpose or GLOBAL signal that can be used for data output and status information. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

Array 30 contains thousands of identical ICs 35; and each IC 35 contains several identical processor/memories 36. In the embodiment disclosed in the '400 patent, it is indicated that the array may contain up to 32,768 ($=2^{15}$) identical ICs 35; and each IC 35 may contain 32 ($=2^5$) identical processor/memories 36. At the time of filing of this application for patent, arrays containing up to 4096 ($=2^{12}$) identical ICs 35 containing 16 ($=2^4$) identical processor/memories each have been manufactured and shipped by the assignee as Connection Machine (TM) computers.

Processor/memories 36 are organized and interconnected in two geometries. One geometry is a conventional two-dimensional grid pattern in which the processor/memories are organized in a rectangular array and connected to their four nearest neighbors in the array. For convenience, the sides of this array are identified as NORTH, EAST, SOUTH and WEST. To connect each processor/memory to its four nearest neighbors, the individual processor/memories are connected by electrical conductors between adjacent processor/memories in each row and each column of the grid.

The second geometry is that of a Boolean n-cube of fifteen dimensions. To understand the n-cube connection pattern, it is helpful to number the ICs from 0 to 32,767 and to express these numbers or addresses in binary notation using fifteen binary digits. Just as we can specify the position of an object in a two dimensional grid by using two numbers, one of which specifies its position in the first dimension of the two-dimensional grid and the other which specifies it position in the second dimension, so too we can use a number to identify the position of an IC in each of the fifteen dimensions of the Boolean 15-cube. In an n-cube, however, an IC can have one of only two different positions, 0 and 1, in each dimension. Thus, the fifteen digit IC address in binary notation can be and is used to specify the IC's position in the fifteen dimensions of the n-cube. Moreover, because a binary digit can have only two values, zero or one, and because each IC is identified uniquely by fifteen binary digits, each IC has fifteen other ICs whose binary address differs by only one digit from its own address. We will refer to these fifteen ICs whose binary address differs by only one from that of a first IC as the first IC's nearest neighbors. Those familiar with the mathematical definition of a Hamming distance will recognize that the first IC is separated from each of its fifteen nearest neighbors by the Hamming distance one.

To connect ICs 35 of the above-referenced applications in the form of a Boolean 15-cube, each IC is 38 and fifteen output lines 39. Each of these fifteen input lines 38 to each IC 35 is associated with a different one of the fifteen dimensions of the Boolean 15-cube and likewise each of the fifteen output lines 39 from each IC 35 is associated with a different dimension. Specific details of the connection wiring for the Boolean n-cube are set forth in the '943 application referenced above. To permit communication through the interconnection pattern of the Boolean 15-cube, the results of computations are organized in the form of message packets; and these packets are routed from one IC to the next by routing circuitry in each IC in accordance with address information that is part of the packet.

An illustrative processor/memory 36 is disclosed in greater detail in FIG. 7A of the '400 patent. As shown in FIG. 7A, the processor/memory comprises 32 × 12 bit random access memory (RAM) 250, arithmetic logic unit (ALU) 280 and flag controller 290. The ALU operates on data from three sources, two registers in the RAM and one flag input, and produces two outputs, a sum output that is written into one of the RAM registers and a carry output that is made available to certain registers in the flag controller as well as to certain other processor/memories.

The inputs to RAM 250 are address busses 152, 154, 156, 158, a sum output line 285 from ALU 270, the message packet input line 122 from communication interface unit (CIU) 180 of FIG. 6B of the '400 patent and a WRITE ENABLE line 298 from flag controller 290. The outputs from RAM 250 are lines 256, 257. The signals on lines 256, 257 are obtained from the same column of two different registers in RAM 250, one of which is designed Register A and the other Register B. Busses 152, 154, 156, 158 address these registers and the columns therein in accordance with the instruction words from microcontroller 20.

ALU 280 comprises a one-out-of-eight decoder 282, a sum output selector 284 and a carry output selector 286. As detailed in the '400 patent, this enables it to produce sum and carry outputs for many functions including ADD, logical OR and logical AND. ALU 280 operates on three bits at a time, two on lines 256, 257 from Registers A and B in RAM 250 and one on line 296 from flag controller 290. The ALU has two outputs: a sum on line 285 that is written into Register A of RAM 250 and a carry on line 287 that may be written into a flag register 292 and applied to the North, East, South, West and DAISY inputs of the other processor/memories 36 to which this processor/memory is connected. The signal on the carry line 287 can also be supplied to the communications interface unit 180 via message packet output line 123.

Each integrated circuit 35 also includes certain supervisory circuitry for the processor/memories on the IC and a routing circuit 200 for connecting the IC to its nearest neighbor ICs in the Boolean n-cube. As disclosed in the '400 patent, supervisory circuitry comprises a timing generator 140, a programmable logic array 150 for decoding instructions received from microcontroller 20 and providing decoded instructions to the processor/memories of the IC, and a communications interface 180 which controls the flow of outgoing and incoming message packets between the processor/memories of an IC and routing circuit associated with that IC.

Routing circuit 200 controls the routing of message packets to and from nearest neighbor ICs in the Boolean n-cube. Through this circuitry, message packets can be routed from any IC to any other IC in the Boolean n-cube. As shown in FIG. 6B of the '400 patent, circuit 200 comprises a line assigner 205, a message detector 210, a buffer and address restorer 215 and a message injector 220 connected serially in this order in a loop so that the output of one element is provided to the input of the next and the output of message injector 220 is provided to line assigner 205. Line assigner 205 comprises a fifteen by fifteen array of substantially identical routing logic cells 400. Each column of this array controls the flow of message packets between a nearest neighbor routing circuit 200 in one dimension of the Boolean 15-cube. Each row of this array controls the storage of one message packet in routing circuit 200. Message detector 210 of a routing circuit supplies message packets addressed to processor/memories associated with this particular routing circuit to a communications interface unit (CIU) 180; and message injector 220 injects a message packet from CIU 180 into the group of message packets circulating in the routing circuit.

Nine such routing logic cells 400 are illustrated in FIG. 11 of the '400 patent which is reproduced as FIG. 2 hereof. The three cells in the left hand column are associated with the first dimension, the three in the middle column are associated with the second dimension and the three in the right hand column are associated with the fifteenth dimension. Each column of cells has an output bus 410 connected to the output line 39 associated with its dimension. With respect to the rows, the three cells in the bottom row are the lowermost cells in the array and receive inputs from input lines 38. The top three cells are the uppermost cells in the array. The middle three cells are representative of any cell between the bottom and the top but as shown are connected to the bottommost row.

Also shown in FIG. 2 are three processing and storage means 420 which represent the portions of the message detector 210, buffer and address restorer 215 and message injector 220 of routing circuit 200 that process and store messages from the corresponding three rows of cells 400 in line assigner 205. Twelve similar processing and storage means (not shown) are used to process and store messages from the other rows.

If no routing conflicts are encountered, a message packet will be routed from an input to a routing cell of the first dimension to the register in the processor/memory to which it is addressed during one message cycle. If there are routing conflicts, the message packet will be temporarily stored in the processing and storage means of a routing circuit at one or more intermediate points; and more than one routing cycle will be required to route the message packet to its destination.

FIG. 2 provides a convenient summary of the input and output terminals of each routing cell 400. As indicated by the three cells 400 along the bottom row, message packets from the different dimensions of the Boolean 15-cube are applied to NAND gates 405. These gates are enabled at all times except during the reset condition. The output of each NAND gate 405, which is the inverted message packet, is applied to an input terminal L-in of one of cells 400 in the lowermost row. A signal representing the presence of a message packet at terminal L-in is also applied to an input terminal LP-in of the same cell. For each cell in the bottom row, this message present signal is held at ground which has the effect of conditioning the cell in the next column in the bottom row for further processing of the message packet received at the cell. Such message present signals representing the presence of a message packet at an input to the cell are used throughout routing circuit 200 to establish data paths through circuit 200 for the message packets.

A message packet received from one of lines 38 is routed out of the lowermost cell 400 in one column from the terminal M-OUT and is applied to the terminal M-IN of the cell 400 in the column immediately to its right. At the same time, the message present signal is routed out of the terminal MP-OUT to the terminal MP-IN of the cell immediately to the right.

The signal received at the M-IN terminal of any cell 400 may be routed out of the cell on any one of the BUS terminal, the U-OUT terminal or the M-OUT terminal, depending on what other signals are in the network. The BUS terminals of all the cells 400 in one column are connected to common output bus 410 that is connected through an NOR gate 415 to output line 39 to the nearest neighbor cell in that dimension of the Boolean n-cube. The other input to NOR gate 415 is a timing signal t-INV-OUT-n where n is the number of the dimension. This timing signal complements the appropriate address bit in the duplicate address in the message packet so as to update this address as the message packet moves through the Boolean 15-cube.

Messages that leave the cell from the U-out terminal are applied to the L-in terminal of the cell immediately above it in the column and are processed by that cell in the same fashion as any signal received on an L-in terminal. The message present signal is transferred in the same fashion from a UP-out terminal to an LP-in terminal of the cell immediately above it.

The circuitry in the cells 400 in each column is designed to place on output bus 410 of each column (or dimension) the message addressed to that dimension which is circulating in the row closest to the top and to compact all rows toward the top row. To this end, control signals Grant (G) and All Full (AF) are provided in each column to inform the individual cells of the column of the status of the cells above them in the column. In particular, the Grant (G) signal controls access to output bus 410 of each column or dimension by a signal that is applied down each column of cells through the G-in and G-out terminals. The circuitry that propagates this signal provides bus access to the uppermost message packet in the column that is addressed to that dimension and prevents any messages in lower cells in that column from being routed onto the output bus. The All Full (AF) signal controls the transfer of messages from one cell 400 to the cell above it in the same column by indicating to each cell through the AF-out and AF-in terminals whether there is a message in every cell above it in the column. If any upper cell is empty, the message in each lower cell is moved up one cell in the column.

For the cells in the top row, the input to the terminal is always high. For these cells, the input signal to the G-in terminal is the complement of the reset signal and therefore is high except during reset. As a result, a message packet in the top cell in a column will normally have access to output bus 410 if addressed to that dimension. If, however, an output line 39 should become broken, this line can be removed from the interconnected 15-cube network by applying a low signal to the G-in input terminal of the top cell of the dimension associated with that line. At the bottom row of cells 400, the Grant signal from the G-out terminal is used to control a pass transistor 425 that can apply a ground to the output bus. In particular, if there is no message to be forwarded on that output line, 0-bits are written to the output line of that dimension.

Operation of certain flip-flops in the cell is controlled by the timing signals t-COL-n where n is the number of the dimension while other flip-flops are clocked by the basic clock signal phi 1. As will become apparent from the following description, the routing cells in each column operate in synchronism with all the other routing cells in the same column of all the routing circuits in array 30.

SUMMARY OF THE INVENTION

The use of thousands of identical processor/memories operating in parallel opens up whole new vistas of computation. Problems which could not be attempted because of the limitations of serial computers now can be executed in reasonable time using a parallel computer such as the Connection Machine Computer.

This vast increase in computing power has stimulated interest in even more complicated problems that tax currently available parallel computers and has stimulated demand for larger and larger parallel computers.

At the same time, extremely large computers are not needed for every problem that can advantageously be addressed by a parallel computer. Some problems simply do not have sufficient data to take up all the resources of a large parallel computer; and others do not make severe demands on the computational powers of a parallel computer. Unless a way can be found to utilize substantial portions of the parallel computer at all times, it is very difficult to justify such computers on economic grounds.

One compromise is to use excess processing and memory capacity to simulate additional parallel processors as described in the '913 application referenced above. In accordance with that technique, the memory associated with each physical processor can be divided into a plurality of sub-memories and each sub-memory can then be used in succession as if it were associated with a separate processor. Thus, a first instruction or set of instructions is applied to all the processors of the parallel computer to cause at least some processors to process data stored at a first location or locations in the first sub-memory. Thereafter, the same first instruction or set of instructions is applied to all the processors of the computer to cause at least some processors to process data stored at the same first location in a second sub-memory. And so forth for each of the sub-memories. While this technique is quite useful in many situations, the physical processor that processes the data for each group of simulated processors is still only a conventional serial (or von Neumann) processor. As a result, if a large number of simulated processors and/or a large amount of data are associated with the physical processor, there is a von Neumann bottleneck at the physical processor.

The present invention is directed to a method and apparatus for improving the utilization of a parallel computer by allocating the resources of the parallel computer among a large number of users. In accordance with the invention, a parallel computer is subdivided among a large number of users to meet the requirements of a multiplicity of databases and programs that are run simultaneously on the computer. This is accomplished by dividing the parallel computer into a plurality of processor arrays, each of which can be used independently of the others. This division is made dynamically in the sense that the division can readily be altered and indeed in a time sharing environment may be altered between two successive time slots of the frame.

Further, the parallel computer is organized so as to permit the simulation of additional parallel processors, as taught in the '913 application, by each physical processor in the array and to provide for communication among the simulated parallel processors. In accordance with the invention, not only is it possible for the simulated processors associated with a specific physical processor to communicate with one another but it is also possible for any simulated processor associated with any physical processor to communicate with any other simulated processor associated with any physical processor in the parallel computer. By analogy to concepts of virtual memory, we will refer to these simulated processors as virtual processors hereafter. Further, in accordance with the invention, means are also provided for storing virtual processors in virtual memory.

As a result of this design, it is possible to build a parallel computer with a number of physical processors on the order of 1,000,000 and a number of virtual processors on the order of 1,000,000,000,000. Moreover, since the computer can be dynamically reconfigured into a plurality of independent processor arrays, a device this size can be shared by a large number of users with each user operating on only a portion of the entire computer having a capacity appropriate for the problem then being addressed. In particular, approximately 1,000 users can be interfaced to the parallel computer by a local area network.

To provide for communication among the processors, the physical processors are interconnected in the form of a binary n-cube of sufficient size to assign each physical processor a unique location in the cube and each virtual processor is assigned its own address. Thus the addressing structure allows for addresses for up to $2^{40}$ virtual processors.

Other features of the parallel computer of the present invention include the following:

The computer supports a normal word-at-a-time instruction set. In addition, it supports an exactly isomorphic set of parallel instructions. For each word-at-a-time operation the corresponding data parallel operation operates concurrently on an entire set of data.

The computer provides hardware support for the distribution and synchronous execution of instructions across multiple processors. As a result, operations across the machine happen in completely determined times with respect to one another.

A user may allocate as much redundancy as necessary to ensure the fail-safe operation of important transactions. This may range from simple self-checking in noncritical applications, to full quadruple modular redundancy for fail-safe transactions. Since the redundant elements are allocated only when necessary, the cost of redundancy is incurred only when such redundancy is desired.

BRIEF DESCRIPTION OF DRAWINGS

These and other objects, features and advantages of the invention will be more readily apparent from the following description of a preferred embodiment of the invention in which.

DETAILED DESCRIPTION OF PREFERRED EMBODIMENT

Figure 3:
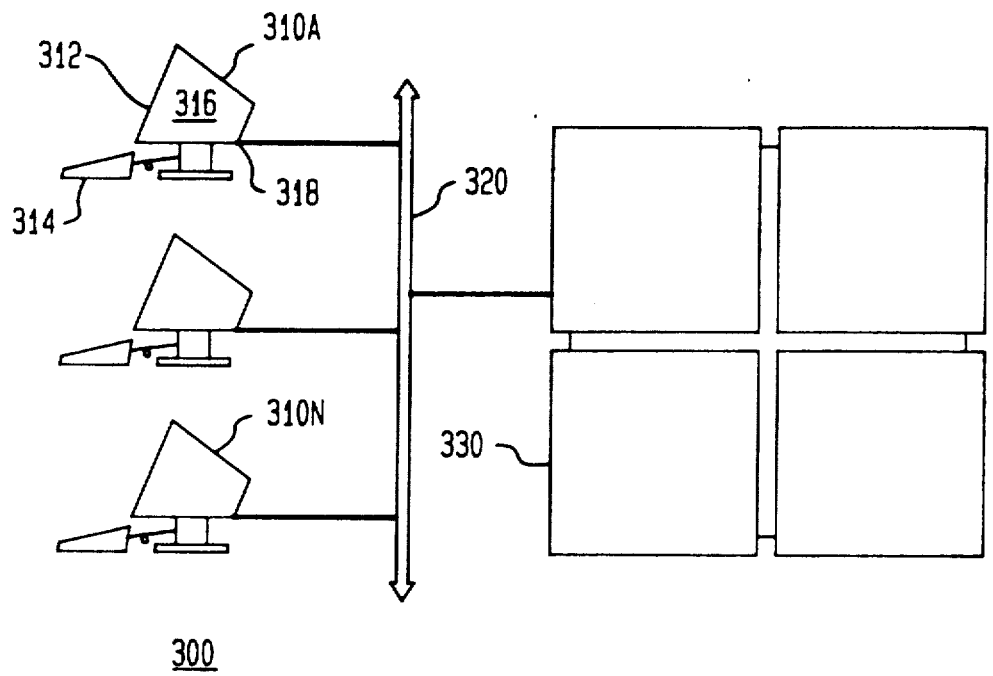
FIG. 3 is a general schematic diagram of a preferred embodiment of the invention.

As shown in FIG. 3, the preferred embodiment of the present invention is a system 300 comprising a plurality of user terminals 310A-N, a local area network 320, and a processor array 330. Illustratively, each terminal includes a console 312 having a keyboard 314 and a CRT display 316, some form of hardcopy output such as a printer (not shown) and an interface 318 between the terminal and the local area network 320. Conventional personal computers can be used as terminals 310 if desired.

Processor array 330 illustratively comprises 262,144 ($=2^{18}$) physical processor units (PPU), four megabytes of high speed read/write or random access memory associated with each processor, substantial additional lower speed mass storage read/write memory and extensive support circuitry. The terabyte of high speed memory typically is provided by integrated circuit memory chips. The mass storage read/write memory may, for example, be 32,768 ($=2^{15}$) hard disk drives each with a capacity of 300 megabytes and a total capacity of ten terabytes. The 262,144 PPUs are connected in an eighteen-dimensional hypercube in which each PPU is connected along each of the eighteen edges of the hypercube to eighteen adjacent PPUs, as described in more detail below.

Local area network 320 connects terminals 310 with some of the PPUs in processor array 330 so that a specific terminal communicates with a specific PPU. These PPUs, in turn, dynamically control other PPUs in the array and the other PPUs may recursively control still more PPUs, so as to provide adequate processing and memory for a specific problem. Preferably the local area network is as flexible as a cross-bar switch so that any terminal can be connected to any PPU connected to the network and that these connections can be varied whenever desired, even as often as required in a time sharing environment. Any of the numerous conventional local area networks, such as the Ethernet (TM) system or a digital PBX (TM) system can be used for this purpose provided it has sufficient capacity to connect the number of terminals that are to be included in system 300. A plurality of local area networks can be used if desired. Illustratively, the local area network should be able to connect 1,000 terminals in the system of the present invention.

As will be apparent, the apparatus of the present invention supports a much larger amount of random access memory than is practical on a conventional machine. This allows entire databases to be stored in main memory where the access time is potentially thousands of times faster than disks. Terabyte main memories typically are not economical on a serial machine since such a large memory is too expensive to keep idle while a single user is accessing merely one location. This problem does not occur in the present invention since many portions of the memory are being accessed simultaneously.

Following the teaching of the above-referenced '913 application, each PPU can be operated as a plurality of virtual processors by subdividing the memory associated with the PPU and assigning each sub-memory to a different virtual processor. In accordance with the invention, the subdivision of memory can even extend to virtual memory such as that on disk or tape storage. Further, each virtual processor can be regarded as the equivalent of a physical processor in processing operations in the computer.

In accordance with the invention, the user can specify to the PPU his requirements for data processing and memory and the PPU can then form a group of processors (both physical processors and virtual processors) sufficient to satisfy these requirements. Advantageously, the group of processors is organized recursively so that one processor controls one or more other processors and these other processors control still more processors and so forth. Preferably, each element of the database is stored on a one-to-one basis with one of the processors and the processors are organized in the same structure as the database. As a result of this arrangement:

1. Each processor is able to execute normal von Neumann type operations including arithmetic/logic operations, data movement, and normal control flow of operations such as subroutine calls and branches.

2. Each processor is able to allocate a set of data processors which will be under its control during parallel instruction execution. The allocating processor is called the control processor and the allocated processors are called data processors. These are relative terms since data processors have the full capabilities of the control processors and are able to allocate data processors themselves.

3. Each processor is able to select a context set from among its allocated data processors. This context set is the set of data to be operated upon in parallel. The context set is chosen according to some condition applied to all of the data processors or to all of the data processors in the current context set. Context sets may be saved and restored.

4. Each processor may perform parallel operations concurrently on all of the data in its context set. The parallel operations are exactly the same as the sequential operations in category 1, except that they are applied to all data in the context set concurrently. These include all data manipulations, memory referencing (communications), and control flow operations. As far as the programmer is able to see, these operations take place simultaneously on all processors in the data set.

5. Each processor is able to access the shared database and load portions of its data elements into its memory. A virtual processor is also able to update the databases.

The instructions of the parallel computer of the present invention are similar to the instructions of a conventional computer. They may be divided into three categories: local instructions, parallel instructions, and context instructions.

The local instructions are exactly the instructions of a conventional computer, including subroutine calls, conditional and unconditional branches, returns, register-based arithmetic data movement, logical operations, and testing. The local instructions are executed within the control processor.

The parallel instructions are exactly like the local instructions except that they are executed concurrently on the context set of data processors. Groups of parallel instructions, called orders, are executed on all virtual data processors in the context set simultaneously. For each local data instruction there is a corresponding parallel data instruction.

The context instructions are used to specify the set of virtual data processors to be executed upon in parallel. There are four context instructions:

set the context to be all virtual processors satisfying some condition;

restrict the context to be some subcontext of processors within the current context, satisfying some condition;

push the current context onto a stack;

pop the current context off the stack.

These context instructions may be intermixed with parallel data instructions into groups to form orders.

The order is the basic unit of synchronization in the parallel computer of the present invention. An order is the unit of communication between a control processor and a data processor. In the simplest case, an order is a single instruction. It may also be a group of instructions that can be executed together without concern for synchronization across physical data processors within the order. The basic action of a control processor is to issue an order through the alpha router (FIG. 7) and wait for confirmation that it has been executed by all data processors. Different virtual processors can, and in general will, execute various instructions within the order at different times.

An order is also the basic unit of caching for instructions in the system. This means that the number of instructions allowed in an order is limited. Since an order may contain a call instruction, the number of operations performed by an order may be arbitrarily large. In addition to subroutine calls, an order may contain simple loops and conditional branching within the order.

Instructions are grouped into orders according to simple rules that assure that the instructions within the order can be executed asynchronously. This can be accomplished, for example, by allowing instructions that involve non-local communication only as the last instruction in an order.

Orders are broadcast from control processors to data processors through the alpha router. It is the alpha router's responsibility to signal the control processor when the order has been executed by all data processors. This signalling mechanism is also used to combine condition codes for control of programming flow within the control processor.

Figure 4:
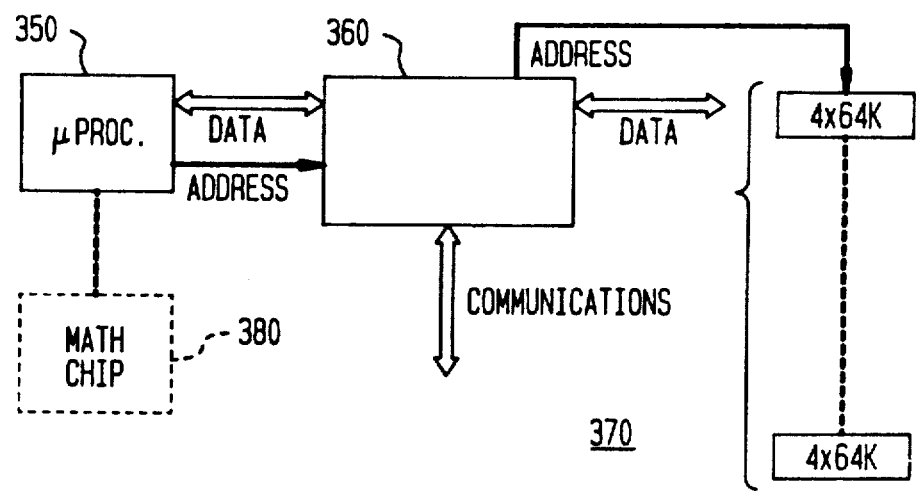
FIG. 4 is a schematic diagram of a processor unit of the present/invention.

As shown in the schematic diagram of FIG. 4, each PPU comprises a microprocessor 350, function circuitry 360, and memory 370. Optionally the PPU may also include a special mathematical circuit 308 or performance of mathematical operations at high speed. Microprocessor 350, memory 370, and mathematical circuit 380 can be conventional integrated circuits. For example, microprocessor 350 can be an Intel 8086 and mathematical circuit 380 can be a floating point accelerator, such as the Intel 8087. Alternatively, the Motorola 68000 can be used and microprocessors such as the Fairchild Clipper are especially advantageous since they have separate instruction and data pins.

Memory 370 can be any high speed, large capacity read/write memory. Illustratively, the memory is a four megabyte memory provided by an array of one hundred twenty-eight 4×64 kilobit integrated circuit chips. Additional memory is advantageously used to store parity and error control bits for error detection and correction. As memory chips of greater capacity become available, such chips can be used to increase the size of the memory and/or to decrease the number of integrated circuit chips required.

Function circuitry 360 is responsible for memory interface, message routing, error correction, instruction distribution and synchronization, data caching, and virtual processor control. This circuitry receives information from the PPU and produces address information suitable for driving the dynamic memories. It also moves data to and from the data pins of the PPU and the data pins of the dynamic memory. The function circuitry also performs all management functions required to operate the PPU as a virtual processor. This organization of microprocessor 350, function circuitry 360, and memory 370 such that function circuitry 360 is located between microprocessor 350 and memory 370 permits the microprocessor to address vastly greater amounts of memory than in the system described in the '400 patent where the microprocessor and the memory are coupled together directly. At the same time, the present organization also accommodates message package routing as will be described below.

Figure 5:
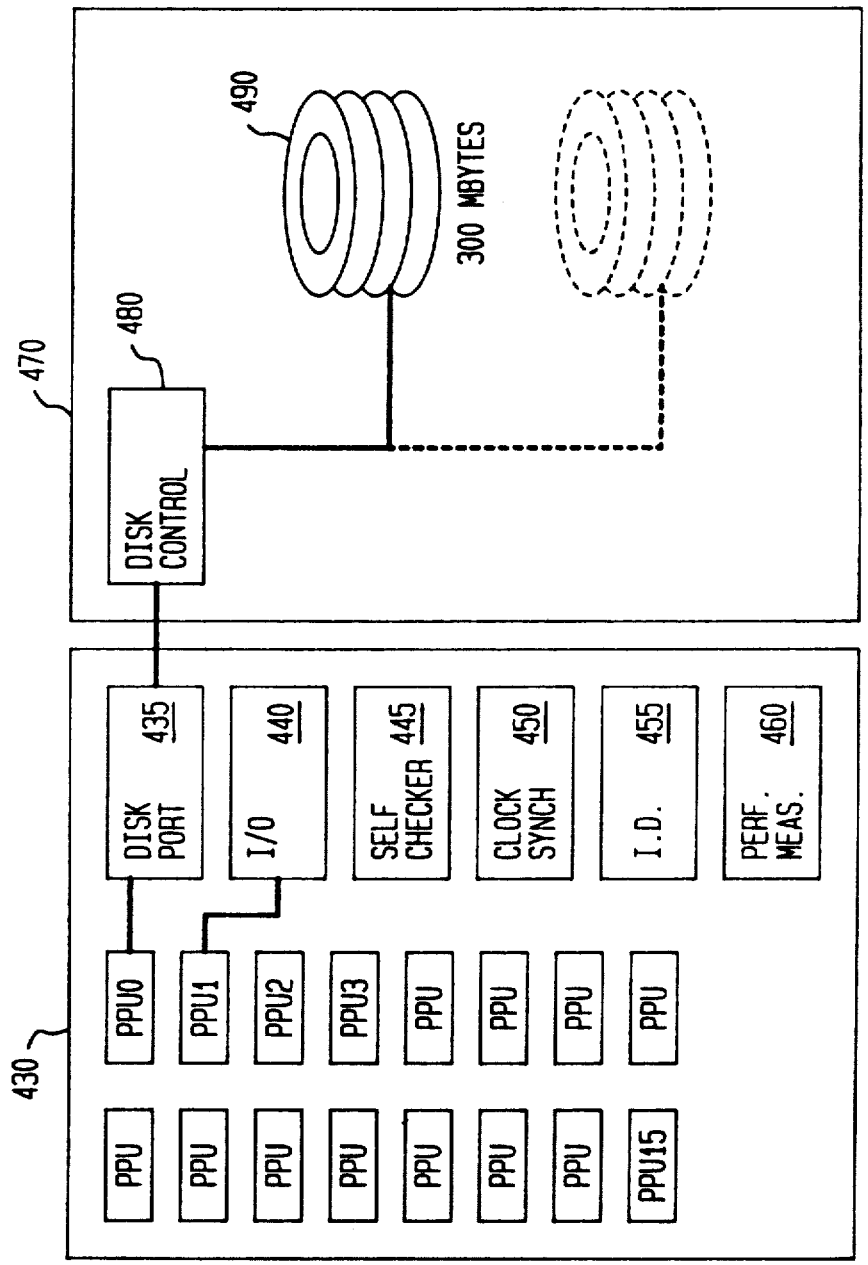
FIG. 5 is a schematic illustration depicting the organization of processor units of FIG. 4 into an array of parallel processors.

The PPUs are organized in units of sixteen such that the integrated circuits of sixteen PPUs 0-15 and support circuitry are mounted on a single circuit board 430 as shown in FIG. 5. The support circuitry includes a disk interface 435, a general input/output circuit 440, self-checking circuitry 445, clock circuitry 450, an identification circuit 455, and performance measurement circuitry 460.

Disk interface 435 is a standard SCSI (small computer system interface) interface connected to PPU 0. It is designed to connect to a mass storage module 470 described below. Its maximum communication bandwidth is approximately 10 megabits per second. The other PPUs on circuit board 430 interface with the mass storage module through PPU 0 which acts as a file server.

Input/output circuit 440 is a 32-bit wide parallel port or a serial port, connected to PPU 1. This port has a maximum bandwidth of approximately 50 megabits per second. Circuit 440 interfaces local area network 320 to PPU 1 which appears on the network as another terminal or simply as a parallel or serial port. The other PPUs on circuit board 430 interface with input/output circuit 440 through PPU 1. As a result of this arrangement, a user at any terminal 310A-N can selectively address any PPU in processor array 330 in much the same way as a user can telephone any telephone connected to the telephone network.

Self-checking circuitry 445 is capable of detecting any fault that occurs on circuit board 430, so that the module can be removed from the system. Advantageously, it is connected to a light-emiting diode that provides a visual indication that the module is off-line to aid in maintenance. Each circuit board contains its own clock circuitry 450, which is synchronized with the clock circuitry of the other PPUs of the system. Identification circuit 455 is an electrically erasable non-volatile memory that contains the manufacturing and maintenance history of the board, the serial number, etc. Performance measurement circuitry 460 monitors the software performance.

Mass storage module 470 illustratively comprises a standard disk controller 480 and a standard 5¼ inch 300-megabyte drive 490, with provision for adding up to seven additional drives on the same controller, for a total storage capacity of 2400-megabytes.

Figure 6:
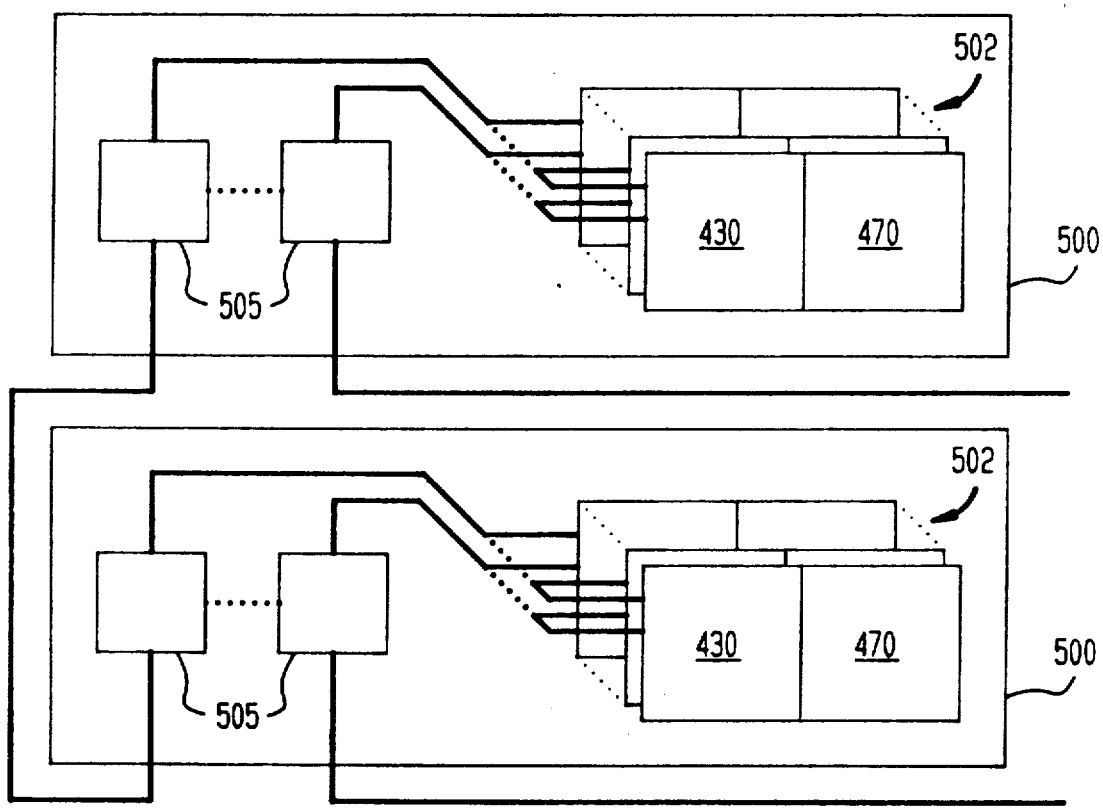
FIG. 6 is a schematic illustration depicting further details of the organization of the processor unit of FIG. 4.

As depicted schematically in FIG. 6, circuit boards 430 and storage modules 470 are mounted in cabinets 500 comprising banks 502 of sixteen boards 430 and sixteen modules 470. Thus, in the case of a system of 262,144 PPUs, 1,024 (=$2^{10}$) cabinets are used to house the PPUs. The cabinets are interconnected by means of fiber optic communication lines. Each cabinet accordingly contains one or more communication modules 505 comprising at least one fiber optic transceiver which is used to multiplex and transmit data between cabinets. The transceivers may be conventional fiber optic transceivers with a data rate of 100 megabits per second and a capability of time multiplexing communications from the various PPUs in one cabinet to those in the other cabinets so as to take advantage of the greater bandwidth of fiber optic communication lines. Advantageously, at least two transceivers are used in each communication module so that signals can simultaneously be transmitted and received at each communication module.

PPUs 330 preferably are interconnected in the hypercube in accordance with the teachings of the above-referenced '943 application. Thus each PPU is connected in the cube network to four other PPUs on the same circuit board corresponding to four dimensions of the hypercube and to four PPUs on four other circuit boards in a cabinet corresponding to four more dimensions of the hypercube. In the case of a system of 262,144 PPUs, each PPU in a cabinet is connected to ten PPUs in ten different cabinets. These ten other connections correspond to the ten remaining dimensions of the hypercube. The connections of each cabinet over each of these ten dimensions is made through a separate communications module 505.

Figure 7:
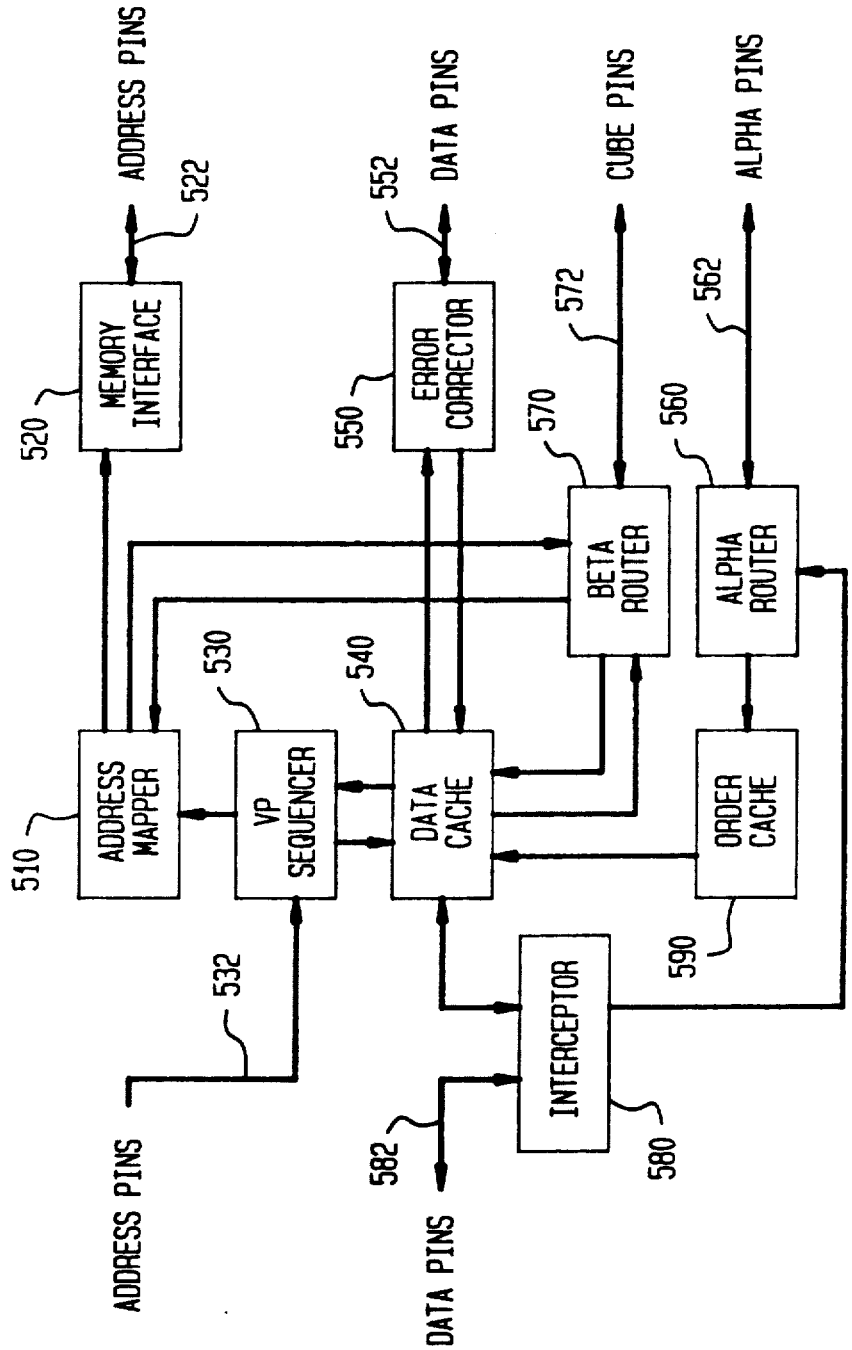
FIG. 7 is a detailed schematic diagram illustrating an element of the processor unit of FIG. 4.

As shown in FIG. 7, the function circuitry 360 contains nine major functional units: an address mapper 510, a memory interface 520, a virtual processor sequencer 530, a data cache 540, an error corrector 550, an alpha router 560, a beta router 570, an interceptor 580, and an order cache 590. Illustratively, all these functional units are implemented on a single integrated circuit or chip but a plurality of chips may also be used. Address pins 532 and data pins 582 connect VP sequencer 530 and interceptor 580 to microprocessor 350 of the PPU. Address pins 522 and data pins 552 connect memory interface 520 and error corrector 550 to memory 370 of the PPU. Alpha pins 562 and cube pins 572 connect alpha and beta routers 560, 570 of a PPU to other alpha and beta routers of other PPUs, as will be described in more detail below.

Figure 8:
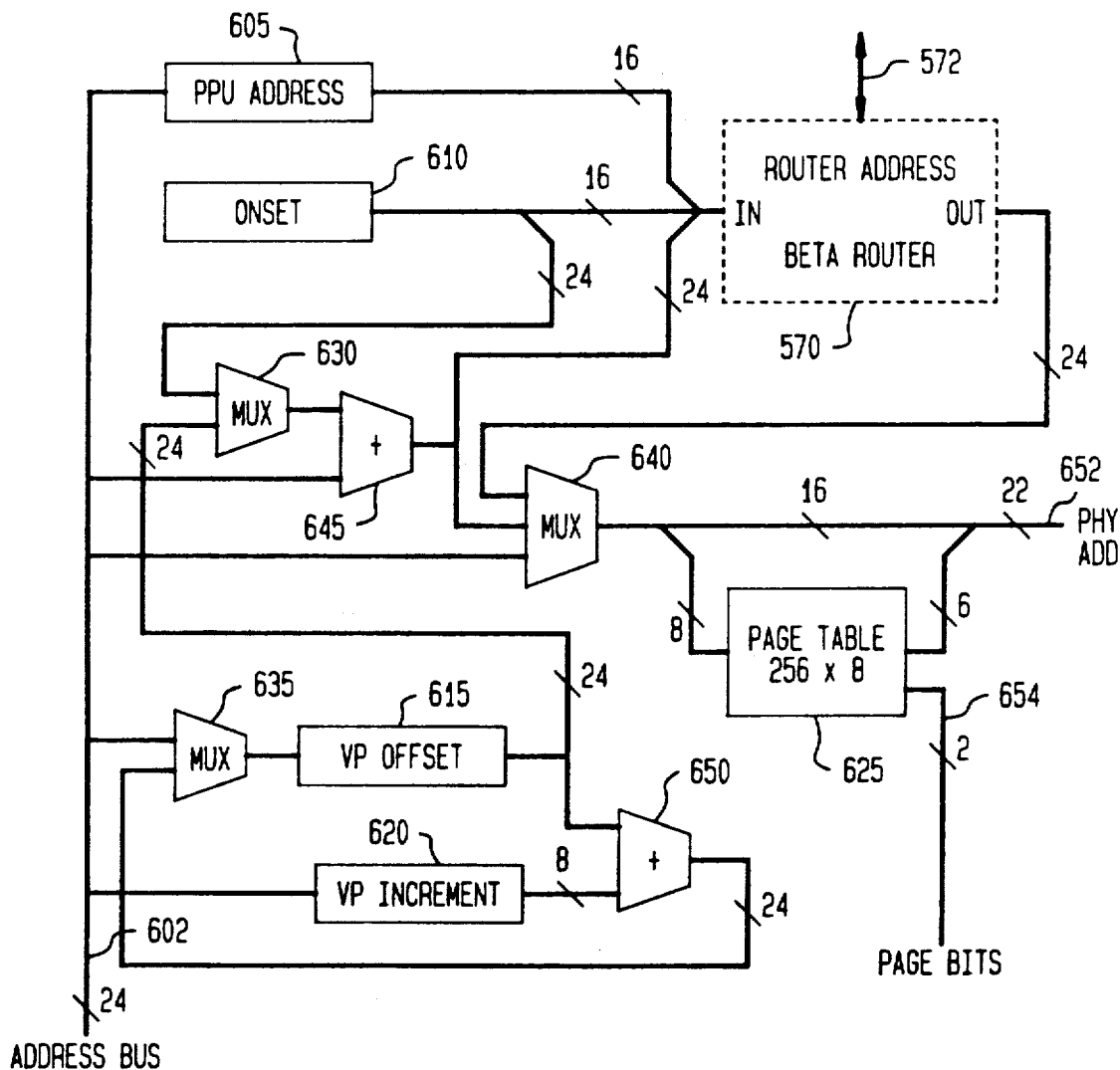
FIG. 8 is a detailed schematic diagram of one of the elements of FIG. 7.

As shown in FIG. 8, address mapper 510 comprises a PPU address register 605, an onset register 610, a VP offset register 615, a VP increment register 620, and a page table 625. The mapper also comprises first, second, and third multiplexers 630, 635, 640 and first and second adders 645, 650. An input to the address mapper is received from VP sequencer 530 via address bus 602 and an output from the mapper is provided to memory interface 520 via physical address bus 652. Two bits of page bits are supplied to VP sequencer 530 via page bits lines 654. As indicated, the address bus is twenty-four bits wide and the physical address bus is twenty-two bits wide.

Figure 13:
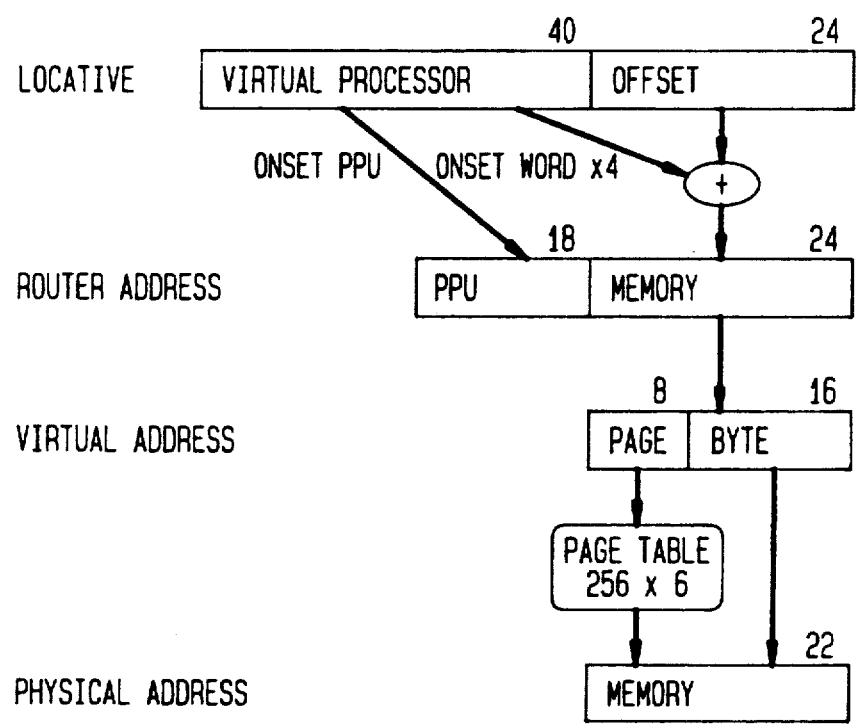
FIG. 13 is an illustration of the addressing scheme for the preferred embodiment of the invention.

To understand the operation of the address mapper, it is helpful to understand the addressing scheme for the system of the present invention. As shown in FIG. 13, there are four types of addresses that are stored in the system: locatives; router addresses; virtual addresses;

and physical addresses. To support enough virtual processors to satisfy the needs of 1,000 users, the system of the present invention supports virtual processors even if stored in virtual memory. Thus, even data physically stored on disks can be associated with a virtual processor. As a result, the system of the present invention is designed to support up to a trillion ($\approx 2^{40}$) virtual processors. Since the entire address space may in principle be used by a single user, the system supports an addressing structure with a 64-bit address space.

The most general form of address is the locative, which requires 64 bits of storage. A locative is capable of pointing to any memory location within any virtual processor in the entire system. The most significant 40 bits of the locative specify which virtual processor is being accessed. The least significant 24 bits specify an offset within that virtual processor. Since $2^{64}$ is larger than the size of virtual memory for the entire system, there is room for redundancy in the coding. In particular, the 40 bits specifying the virtual processor separately specify the PPU in which the virtual processor resides (18 bits) and the word within the virtual memory of that physical processing unit at which the virtual processor begins (22 bits). A virtual processor may begin on any even 32-bit boundary within the physical processing unit's 24-bit virtual address space.

Router addresses are the addresses used by the communications network. They are essentially a compacted form of locatives that are formed by adding together the 24-bit offset and four times the 22-bit offset section of the virtual processor address. A router address specifies a single word in the virtual memory of some physical processor unit within the system. The length of a router address is 42 bits, which corresponds to the number of words of virtual memory on the entire system.

Within a PPU, all pointers are stored in terms of 24-bit virtual addresses. In such an address, 8 bits represent a page of memory and 16 bits represent the address of a byte within that page. The page is the unit of demand-based caching for the virtual memory system. At any given time, up to 64 pages may physically be within memory.

The 24-bit virtual address is mapped onto a 22-bit physical address by page table 625. The page table is a 256-word by 6-bit lookup table that maps each of the 28 pages in virtual memory into the $2^6$ pages in physical memory.

Address mapper 510 takes the virtual address entering the function circuitry a converts it either to a physical address for memory or to a router address for communications. The address mapper is designed to support three different modes of addressing: normal, virtual processor relative, and extended. In normal addressing mode, a 24-bit physical address is taken directly from the PPU and split into an 8-bit page number and a 16-bit offset. The 8-bit page number is used as an index into page table 625 that contains the mapping of virtual pages onto physical memory. In the case where the reference page is in physical memory, the page table will produce a 6-bit address telling in what part of physical memory the page resides. This is combined with the 16-bit offset to form a 22-bit physical address that goes directly to the memory interface. In the case where the referenced page is "swapped out," the page table will so indicate by the settings of the page bit and a trap will be taken to allow the page to be loaded in from secondary storage into physical memory. Pages are loaded in on a first-in/first-out basis, so that a new page will be loaded on top of the least recently loaded page. It is also possible for the use of the page bits to "wire in" certain pages so they will never be moved off onto secondary storage.

The second mode of addressing is virtual processor relative. In this case, the address coming in from the bus is taken to be an offset relative to the virtual processor offset address for the virtual processor currently being executed. These two 24-bit addresses are added together by adder 645 to create a 24-bit virtual address that is then converted into a physical address through the page table as before. The virtual processor offset is set by the virtual processor sequencer or, perhaps, by incrementing in the case of fixed size virtual processors.

The final form of addressing is the mechanism by which the interprocessor communication is accomplished. In this case, the relevant function is computed through the beta router and the address is calculated as follows: The 18-bit address of the destination PPU is concatenated onto the sum of a 24-bit physical address coming from the chip (the offset) and the 24-bit onset word loaded into the onset register 610. Typically this is loaded by the previous cycle during an extended addressing operation. When a message address is received, the memory portion of the received address, which was computed from the sum of an onset and an offset, is used as a virtual memory address and is indexed into the physical address through the page table as in normal addressing.

Figure 9:
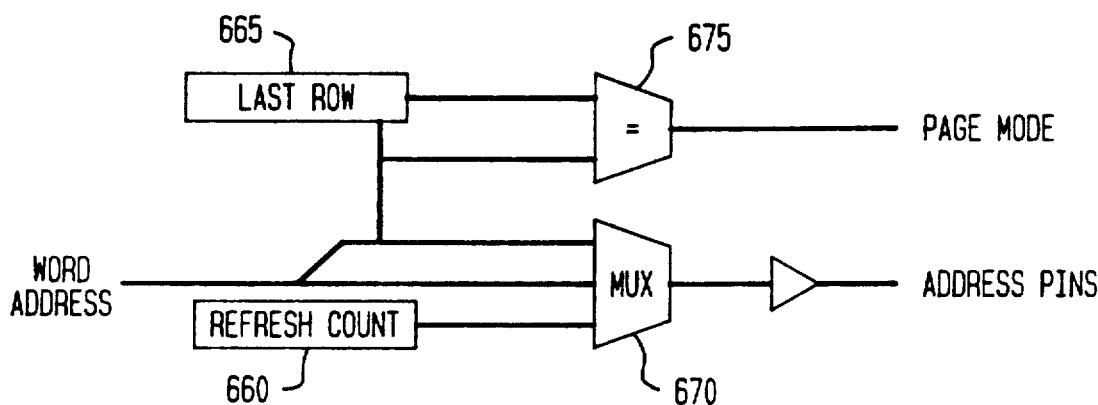
FIG. 9 is a detailed schematic diagram of another of the elements of FIG. 7.

Memory interface unit 520 is responsible for the physical multiplexing of the addressing and the memory refresh for dynamic rams. As shown in FIG. 9, interface unit 520 comprises a refresh counter 660, a row number register 665, a multiplexer 670, and a comparator 675. Multiplexer 670 multiplexes the 22-bit physical address onto the 11 address pins. Refresh counter 660 may be reset for diagnostic purposes. The memory interface unit is also designed to take advantage of fast block mode accesses as supported today by most dynamic rams. In order to do this, the memory interface unit stores the row number of the last row accessed in row register 665. If comparator 675 determines that an access is performed to the same row as the previous access, then a fast cycle will be performed that strobes only the column portion of the address. Thus, references to the same block of memory can be performed in approximately half the time required for a general random access. This is particularly important for accessing blocks of sequential data.

Virtual processor sequencer 530 is a simple finite state machine for quickly executing the list operations required for the overhead of virtual processors. A PPU implements multiple virtual processors by multiplexing their operation sequentially in time. A certain portion of the PPU's memory space (including its virtual memory) is allocated to each virtual processor although the amount of virtual memory per virtual processor is completely variable. Typically, virtual processors implemented by a PPU are engaged in several different tasks. For each task, the PPU must sequence through all processors in the current context of the task to apply the order being executed. It must also sequence through each of the orders associated with the sequence of tasks. However, it is not necessary to sequence through the virtual processors implemented by the PPU that are not in the context of the task being executed. As a result, there is a significant savings in the time required to sequence through the virtual processors implemented by the PPU.

Figure 14:
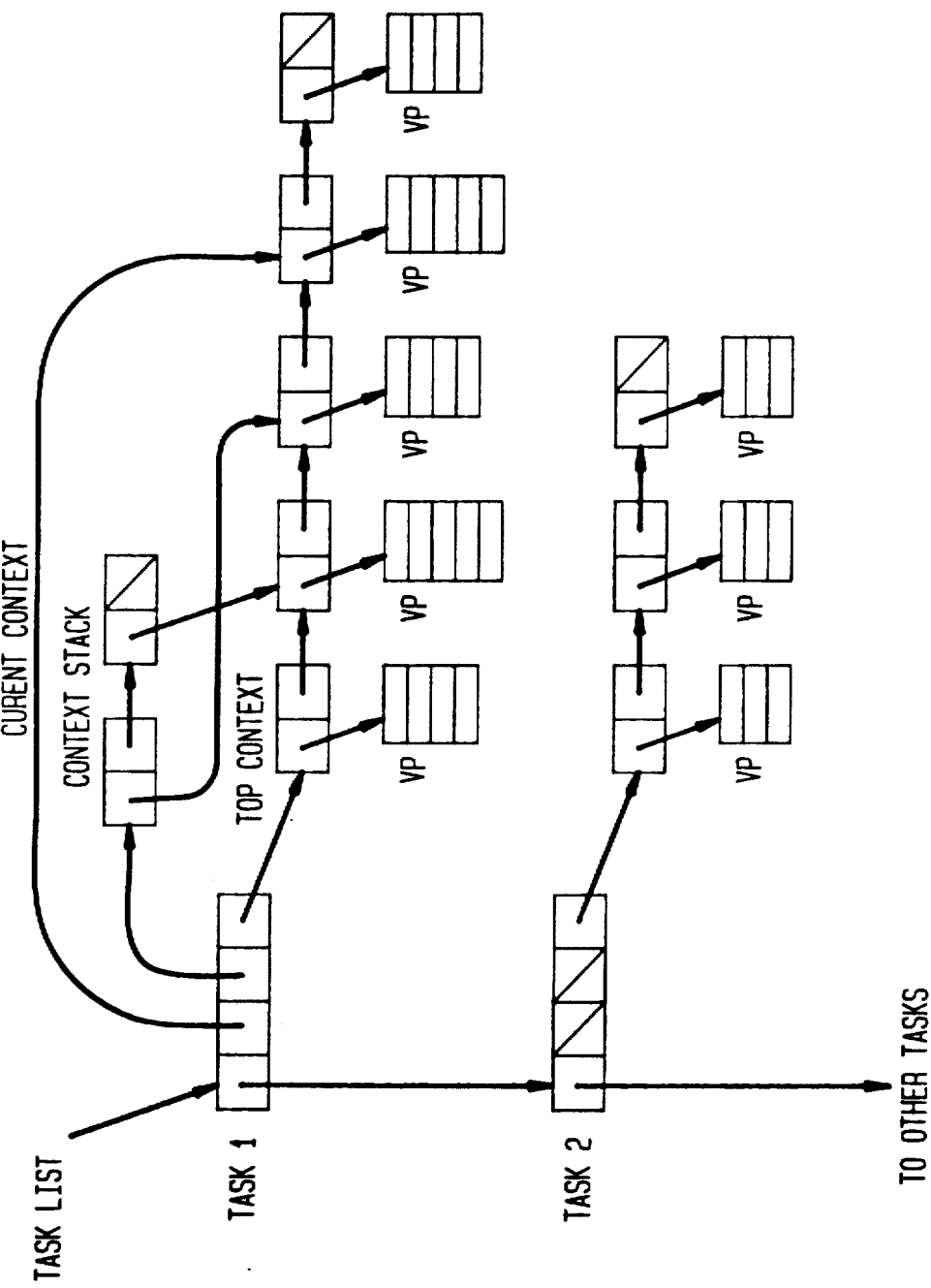
FIG. 14 is a schematic illustration useful in understanding a portion of the invention.

Both virtual processors and multiple task context switching are supported directly in hardware. The organization of virtual processors in memory is shown schematically in FIG. 14. The tasks are linked together into a circular list called the task list, and the PPU at any given time contains a pointer to one of the tasks in the task list. With the aid of sequencer 530, the PPU cycles through each task in turn, executing an order for every virtual processor in the context of the current task before going on to the next task. Thus, if the context is relatively small, the execution will take place in a smaller amount of time than if all the virtual processors are in the current context.

Each task has associated with it a header that contains three pieces of information: a pointer to the current context, a pointer to a stack stored as linked list, and a pointer to the list of all the virtual processors in the task. The sequencer also contains a pointer to the next task in the task list and auxiliary information about the task, such as priority and run statistics. The PPU determines the location of each virtual processor in virtual memory by following a linked list, starting with the context pointer and continuing until a null terminator is reached. These lists are stored in a protected region of memory.

To execute a "push-context" instruction, the PPU allocates a new storage element and pushes the current context pointer onto the stack, changing the stack pointer to the top of the stack. A "pop-context" instruction is just the reverse, except if the stack underflows then the top level context pointer is used. The next most common operation is restricting the context to a subset of the current context according to some condition. In this case, the virtual processor list is split according to the condition, starting from the current context. The virtual processors that meet the specified condition are appended at the end of the list. A pointer to the tail of the list then becomes the current context. This way the sequence of nested subsets that represent the successive contexts are stored efficiently. With this scheme, virtual processors that are not in the current context incur no overhead during order execution.

Figure 10:
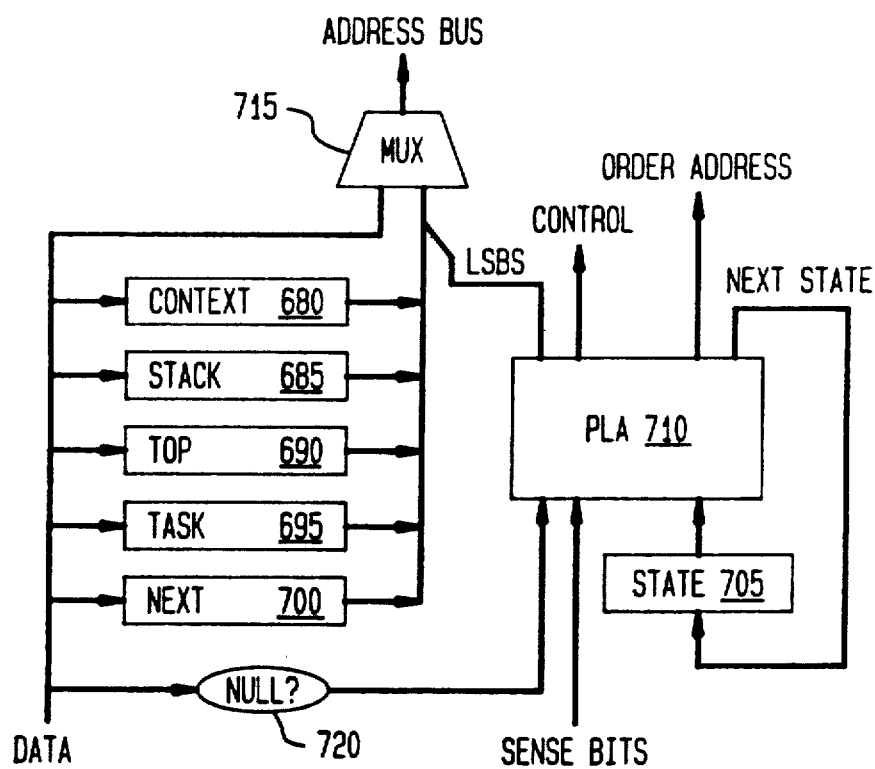
FIG. 10 is a detailed schematic diagram of another of the elements of FIG. 7.

As shown in FIG. 10, virtual processor sequencer 530 contains five primary registers, each of which is capable of holding the most significant 22 bits of a virtual processor address. Context register 680 holds a pointer to the beginning of the current context list. Stack register 685 holds a pointer to the context stack for the current task. Top register 690 holds a pointer to the top of the context list of the current stack. Task register 695 holds a pointer to the next task in a task list and next register 700 holds a pointer to the next virtual processor in the virtual processor list. Additional registers may be used to store auxiliary information as needed. The output of sequencer 530 is selected by multiplexer 715 in response to signals from a programmable logic array (PLA) 710.

The virtual processor sequencer contains within it a finite state machine implemented in state register 705 and PLA 710 for manipulating these registers and for controlling the registers in the address mapper and order cache. This finite state machine sequences through the list manipulating instructions necessary to perform the overhead of swapping both tasks and virtual processors. The outputs of the state machine depend on the current state and on the condition bits coming from the rest of the function circuitry, for example, the page bits of page table 625. The PLA is also able to make conditionally dependent transitions based on whether or not the current data is null as detected by a null detector 720. In a sense, the virtual processor sequencer is a very simple computer without an arithmetic unit.

Data cache 540 is a completely conventional cache for caching read-only data.

Figure 11:
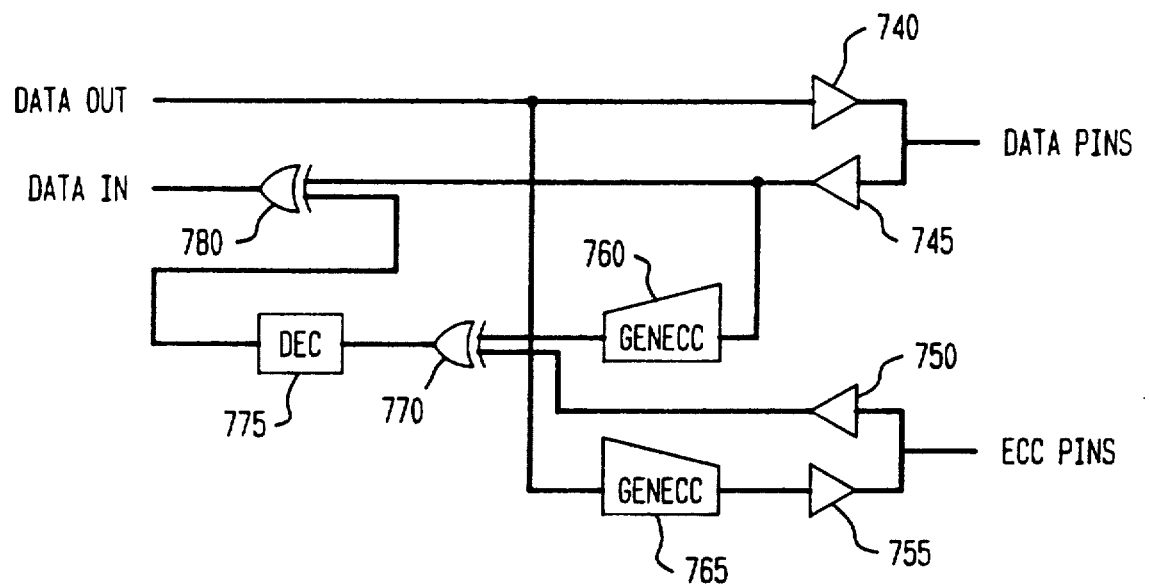
FIG. 11 is a detailed schematic diagram of another of the elements of FIG. 7.

Error corrector 550 is standard single-bit error correction, multiple-bit error detection logic, based on a 6-bit Hamming code. As shown in FIG. 11. it comprises line drivers 740, 745, 750, 755, error control circuits 760, 765 for computing parity bits, exclusive-OR gate 770 for detecting parity errors, a decoder 775 for determining if an error can be corrected, and an exclusive-OR gate 780 for correcting a detected error. Error control circuit 765 adds error correction bits to all data written to physical memory. All data read from physical memory is checked by recomputing in error control circuit 760 the parity bits for the data read from memory and comparing these bits at XOR gate 770 with the parity bits read from memory. Decoder 775 determines if an error can be corrected and does so by applying the appropriate signal to XOR gate 770 if possible. If a multiple error occurs, a unit failure is signalled by decoder 775.

Figure 12:
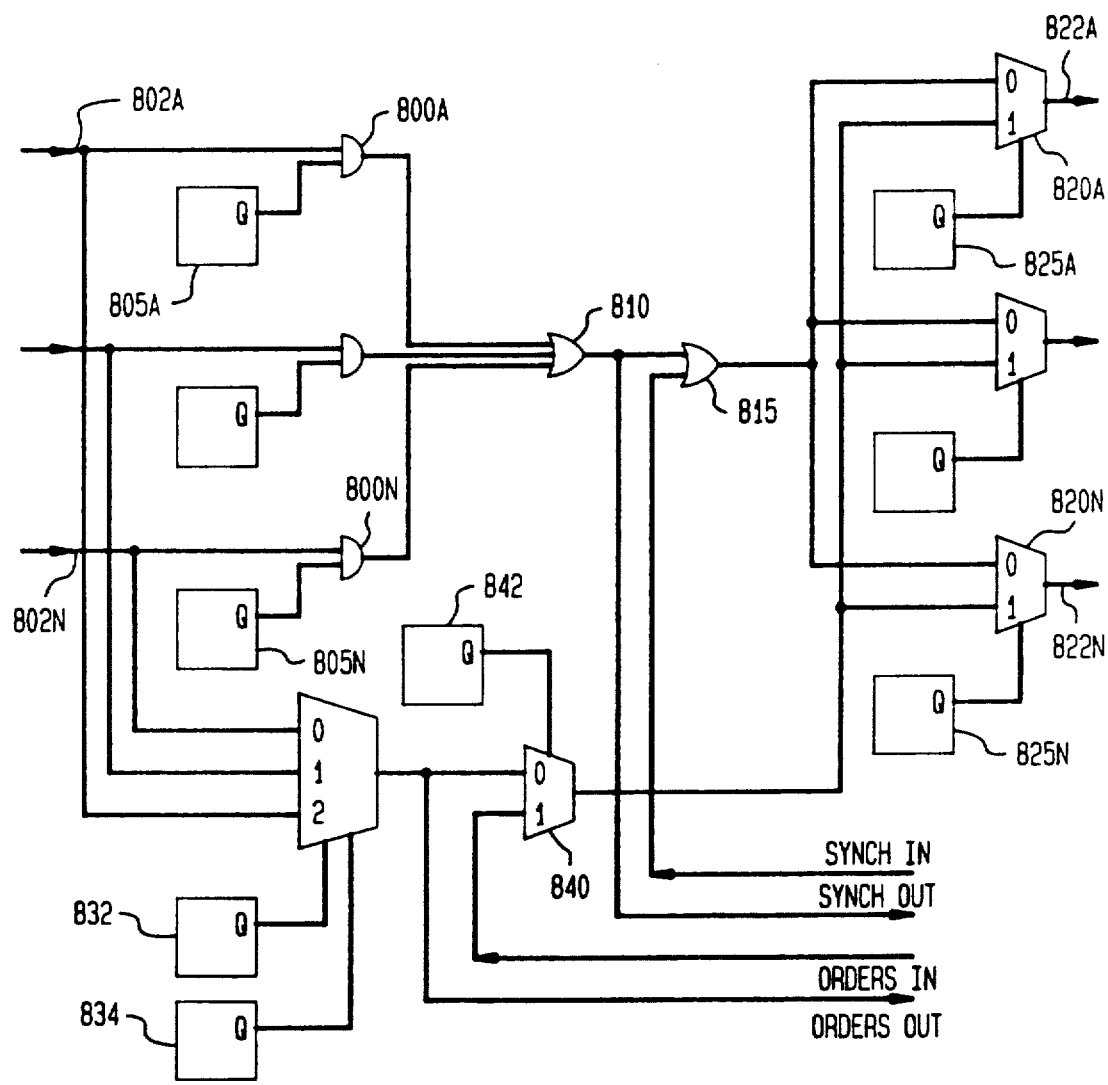
FIG. 12 is a detailed schematic diagram of another of the elements of FIG. 7.

The alpha and beta routers 560,570 are used for instruction and data distribution, respectively, and may share physical communication wires, although the routing hardware is separate. As shown in FIG. 12, alpha router 560 comprises an array of AND gates 800A-N controlled by flip-flops 805A-N, first and second OR gates 810, 815, an array of multiplexers 820A-N controlled by flip-flops 825A-N, a first multiplexer 830 controlled by flip-flops 832, 834, and a second multiplexer 840 controlled by a flip-flop 842. Input lines 802A-N are applied to AND gates 800A-N and output lines 822A-N extend from multiplexers 820A-N. These lines connect the alpha router of a PPU to the alpha routers of the nearest neighbor PPUs in the binary hypercube. Accordingly, the number of AND-gates 800A-N, multiplexers 820A-N and their associated circuitry corresponds to the number of dimensions of the hypercube, illustratively eighteen, but only three have been shown for purposes of illustration. Since the input and output lines associated with each dimension go to the same alpha router, these lines can be multiplexed if desired. Moreover, since these lines go to the same PPUs as the input and output lines of the beta router, they can also be multiplexed with the lines of the beta router.

The alpha router is used to distribute and synchronize instructions. It essentially serves the same function as the instruction distribution tree and global-or trees described in the '400 patent, except that any processor, or any number of processors simultaneously, may be sources of instructions. These instructions are bunched into groups called orders. Execution of an order is synchronized across the whole machine by the alpha router, so that one order will be executed completely before the next order is issued.

Orders that are to be broadcast are received on the orders in line from local interceptor 580 and orders that are received from other routers are provided via the orders out line to order cache 540. Synchronization signals indicating completion of a received order are provided by the PPU to the router on the synch in line and signals indicating completion of an order by other PPUs are provided to the PPU on the synch out line.

The mode of operation of the alpha router is controlled by the flip-flops in accordance with signals received from the PPU. Thus, if the local PPU is to broadcast orders to other PPUs, flip-flop 842 sets multiplexer 840 to transmit the signal on the orders in line and flip-flops 825A-N set multiplexers 820A-N for transmission of these signals. If the local PPU is to receive orders from another PPU, flip-flops 832, 834 are set so as to specify the particular incoming dimension line to multiplexer 830 from which the order is expected. If the order is to be passed through to another PPU, flip-flop 842 also sets multiplexer 840 to transmit the signal from multiplexer 830 to multiplexers 820A-N. By this arrangement, a PPU can broadcast orders to each of its nearest neighbors and thereby control them; and each PPU can listen for orders from one of its nearest neighbors so as to be controlled by it.

After an order has been issued, the PPU that issued the order monitors the performance of the order by means of the synchronization signals. A PPU issues a synch signal via the synch in line to OR-gate 815 and by setting flip-flops 825A-N so that multiplexers 820A-N transmit the signal from OR-gate 815. A synch signal is received by setting flip-flops 805A-N so as to enable AND-gates 800A-N to pass a received signal to OR-gate 810. The output of OR-gate 810 can also be passed on to other PPUs via an input to OR-gate 815. By this arrangement, a PPU can listen selectively for synch signals from those nearest neighbor PPUs which it controls and ignore signals from other PPUs which it does not control.

Figure 1:
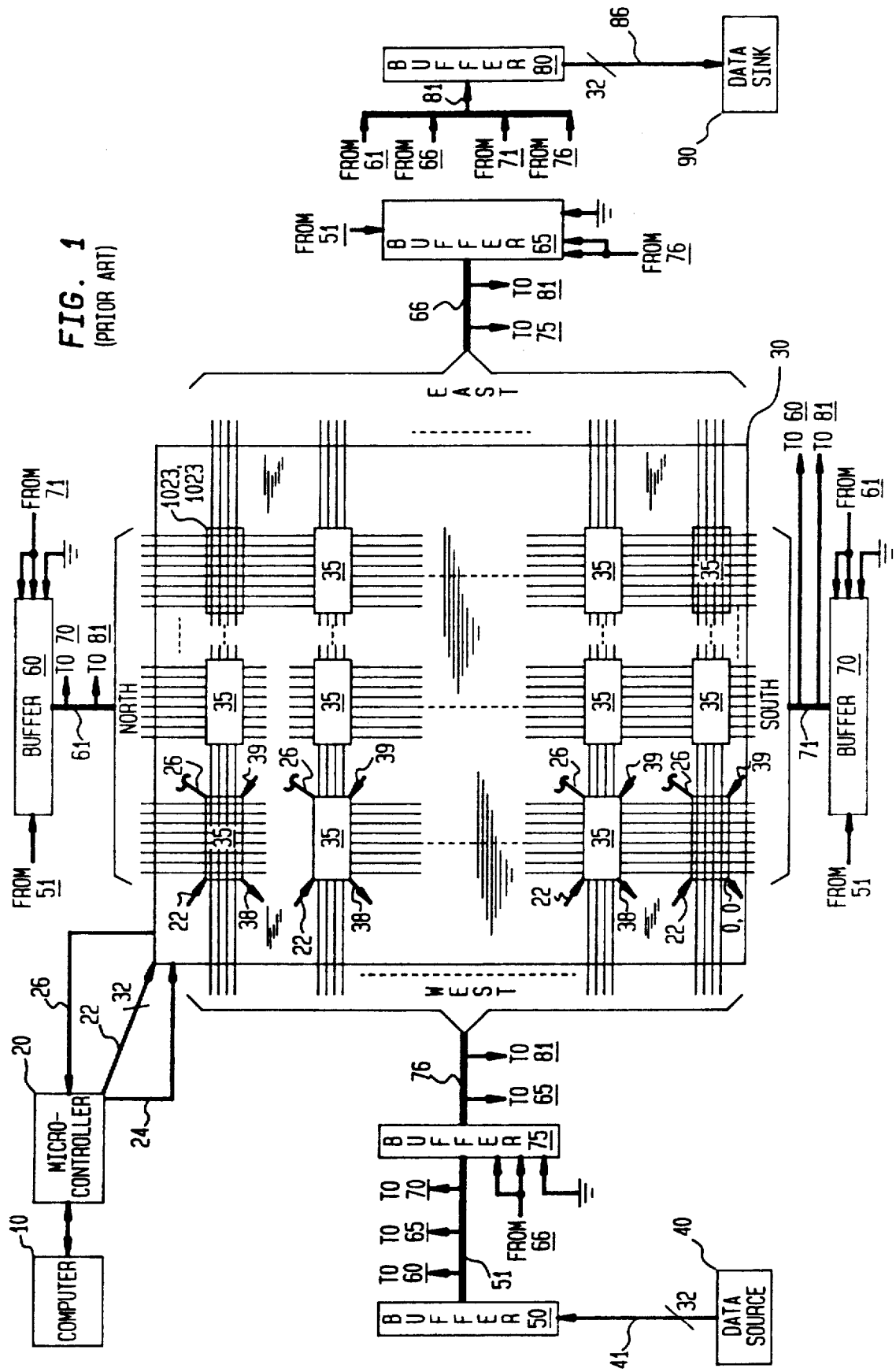
FIG. 1 is a schematic diagram of a parallel processor of the prior art.
Figure 2:
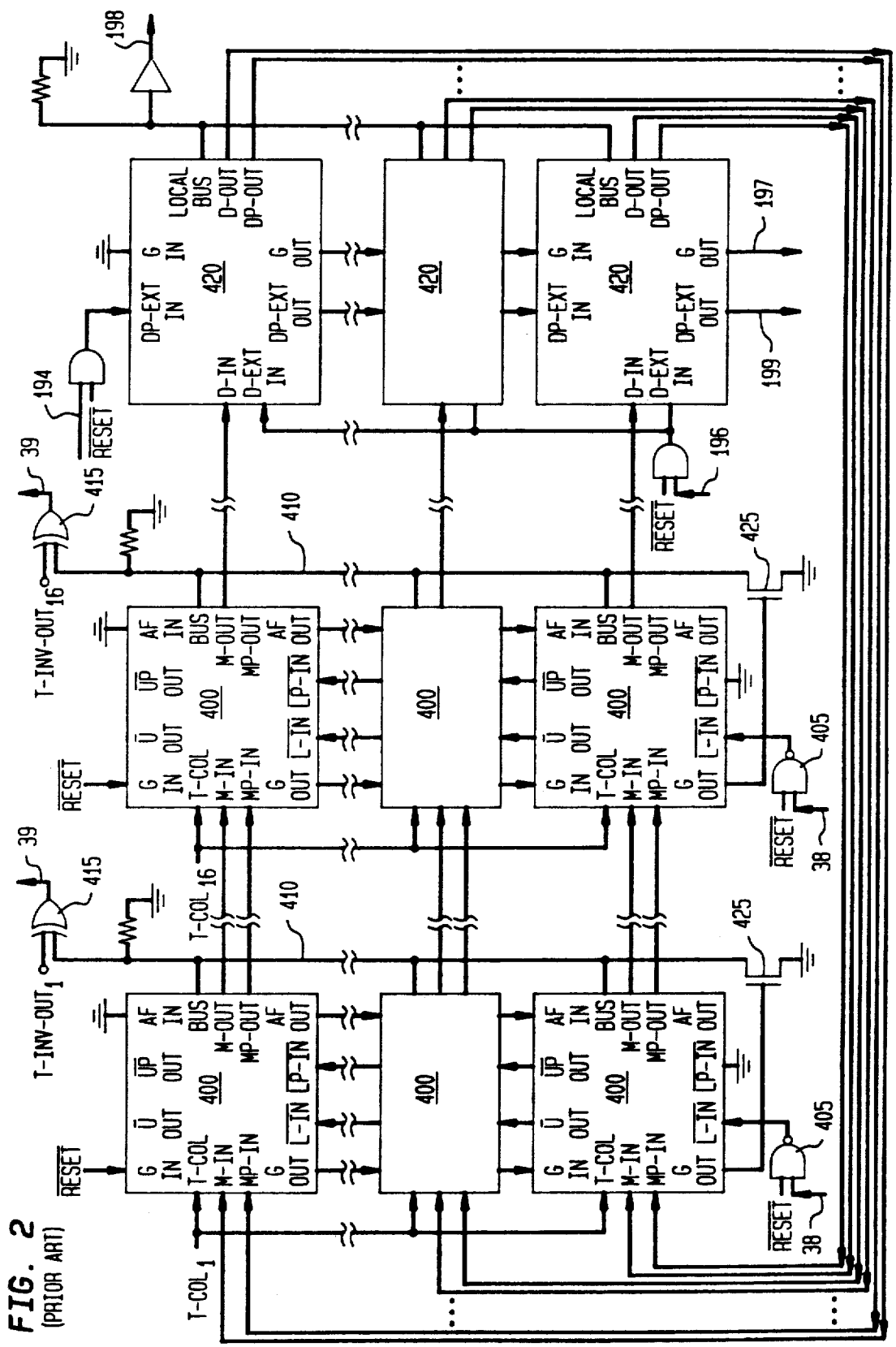
FIG. 2 is a schematic diagram of a routing circuit of the parallel processor of FIG. 1.

The beta router 570 is essentially the same type of router as described in the '400 patent. As shown in FIG. 2, it has an array of input and output lines 38, 39 which communicate with the beta routers of the nearest neighbor PPUs in the hypercube via cube pins 572 of FIG. 7. Message packets are provided to beta router 570 from the microprocessor via address mapper 510 and data cache 540 and received message packets are provided to the microprocessor through these same elements. The input and output lines can be multiplexed together and these lines can also be multiplexed with lines 802A-N and 822A-N of the alpha router.

The beta router is responsible for essentially three different functions. It routes message packets from one PPU to another, the same function performed in the '400 patent. It generates message packets corresponding to memory requests from the PPU with which it is associated to memories associated with other PPUs. It receives incoming message packets from other PPUs that are destined to the PPU with which it is associated and delivers these messages appropriately. While these latter two functions are new, the routing of the message packet in each function is the same as that disclosed in the '400 patent.

A fully configured parallel computer of the present invention is an expensive resource, probably too expensive to be tied up by a single user for any large period of time. One of the design premises of the computer is that it may be used simultaneously by thousands of users. While a user's peak requirements may be very high, it is assumed that the average requirement will be relatively modest, say a hundred million instructions per second per user. In addition, it is assumed that users will be able to take advantage of shared resources other than just the computing cycles, for example, information in shared databases.

The technique used for sharing the resources may be called space sharing, by analogy to time sharing, since the users divide the space-time resource of the computer by sharing it in space as well as time. In this sense, space sharing might be more accurately called "space-time sharing," since it can also involve multiplexing in time. Space-time sharing would work even if every user presented the entire system with a uniform load at all times, but it works better than this in terms of perceived benefits to the user because of the following non-uniformities in a typical user load:

Idle Time: Many users when they are "using the machine" in fact require very few cycles most of the time. This is particularly true of a transaction-based system supporting queries and a shared database.

Non-Uniform Parallelism: When executing a parallel program, there may be many points in the program where it is possible to efficiently utilize hundreds of thousands of virtual processors simultaneously. There may be other points where a single word-at-a-time execution is sufficient.

Non-Uniform Memory Requirements: Many users will require direct access to only a relatively small portion of the computer's one terabyte memory at any given time.

Commonality of Data: Many users may be accessing the same database within a short period of time, allowing it to be kept in main memory at relatively low cost. A similar argument holds to shared software.

To exploit these non-uniformities, the computer dynamically allocates physical processors to virtual processors, based on runtime requirements. Thus a user consumes resources in proportion to what the application actually uses, as opposed to in proportion to how much it might conceivably use.

A feature of the beta router makes it possible to subdivide the array of PPUs among different users so as to provide for space sharing. As shown in FIG. 2, the G-in input terminal controls access to the communication line 39 which conveys a message packet from one PPU to another. If this line is broken, it can be removed from the network by applying a low signal to the G-in input terminal associated with that line. In accordance with the present invention, any sub-cube of the hypercube can be isolated from the rest of the hypercube by applying a low signal to the G-in input terminals associated with the communication lines that connect the sub-cube to the rest of the hypercube. For example, a sub-cube of 256 PPUs can be isolated from the eighteen-dimension hypercube simply by applying low signals to the G-in input terminals associated with the communication lines for dimensions eight through eighteen at each of the 256 PPUs of the sub-cube. At the same time, numerous other sub-cubes in other parts of the hypercube can similarly be isolated from the hypercube by applying low-signals to the G-in input terminals associated with the communication line for the dimensions that are not used.

To accomplish this, the microprocessor of each PPU is given access to the G-in input terminal so that it can impose a low signal in response to a specified configuration of a sub-cube. Access illustratively may be furnished by a flip-flop (not shown) whose output state can be controlled by the microprocessor of the PPU.

In accordance with the invention, a tag bit in the instruction identifies parallel instructions that are to be executed in parallel by other PPUs. Interceptor 580 tests this tag bit. All data accessed from memory by the PPU passes through the interceptor 580. If the tag bit of the data indicates that it is a parallel instruction, then a no-op instruction is sent to the data pins and the interceptor sends the parallel instruction to the alpha router for broadcast to other PPUs. If the tag bit does not indicate a parallel instruction, the instruction is passed by the data pins to the PPU.

Order cache 590 is a memory used for storing orders from the alpha router. Virtual processor sequencer 530 will cause the PPU to access instructions from the order cache to implement the action on each virtual processor. The order cache is essentially an instruction cache for the instructions that are being operated upon in parallel by each task. Illustratively, the cache is 256 words deep.

Because of the computer's internal duplication of components, it is naturally suited to achieve fault-tolerance through redundancy. Advantageously, all storage in the database is on at least two physically separate modules so that when a storage module fails, data from a backup module is used, and duplicated to create another backup. When a processor module fails, it is isolated from the system until it can be replaced and physical processors are allocated from the remaining pool of functioning processors.

The most difficult problems in a fault-tolerant system of this kind are detecting and isolating failures when they occur, and dealing with the task that is being processed at the time the failure occurs. Here, there is a tradeoff between the degree of certainty that a task will complete flawlessly and the amount of hardware allocated for the task. In the parallel computer of the present invention, the user is able to make this tradeoff at runtime, depending upon the criticality of the task. A task may by executed in one of three modes according to the amount of redundancy required.

In the simplest mode of operation of the system, self-checking hardware such as error corrector circuitry 550 of FIG. 11 is used to detect and isolate failures. This hardware is capable of detecting the most frequent type of errors and failures, for example, uncorrectable memory errors, loss of power, and uncorrectable errors in communication. Whenever a fault is detected by the self-checking circuitry, in the self-checking mode of operation, the current transaction is aborted and the hardware is reconfigured to isolate the defective part. The transaction is then restarted from the beginning.

While the self-checking circuitry will detect most errors that occur, it is not guaranteed to detect every type of error. In particular, many errors that occur within the PPU itself will not be detected. In dual redundant mode, the operation system executes two identical copies of the program onto two physically separate isomorphic sets of processors and compares the intermediate results at regular intervals. (The wires of the communications system, which are in the pattern of an n-dimensional cube, provide exactly the right communications paths for this type of comparison.) The comparison mechanism guarantees the detection of errors however and why they occur. Once the errors are detected in dual redundant mode, they are handled in exactly the same manner as in self-checking mode. Both processors are isolated from the system until diagnostics are able to determine which processor was at fault.

A disadvantage of the self-checking and dual modes of redundancy is that they require restarting a transaction if an error occurs. This may not be acceptable for tasks that cannot be broken down conveniently into relatively small transactions. Also, some tasks have real-time processing requirements that do not allow for the retry of a transaction. For either of these two situations, quadruple redundancy mode is the appropriate mode for achieving fail-safe operation.

In quadruple redundancy mode, four identical copies of the application are run in synchrony. Each task compares its operations with another in a circular fashion; for example, A checking B, B checking C, C checking D, and D checking A. When an error occurs, it is both detected and isolated by the pattern of mismatch comparison In this case, the correct state of the process is copied from one of the non-erring tasks into another sub-cube and the operation is continued without significant interruption. Quadruple, rather than triple, redundancy is used so that the appropriate wires for comparison are available in the n-dimensional cube.

As will be apparent, numerous variations may be made in the above described method and apparatus within the spirit and scope of the invention. For example, while the invention has been described in the context of an array of parallel processors organized in the form of a binary hypercube, it will be understood that other organizations can also be used as set forth in the '400 patent. Obviously in such cases, suitable modification will also be required for communication apparatus such as the alpha and beta routers described above for signalling in the processor array.

What is claimed is:

1. A parallel computer comprising:
   a plurality of processor units, each processor unit comprising a processor, a read/write memory and a control circuit,
   a plurality of host computers, and
   means for interconnecting said host computers to at least some of the processor units to form a multiprocessor environment,
   each said control circuit of a processor unit comprising:
   means for interconnecting said processor units by routing message packets from one processor unit to another via communication lines in said parallel computer, and
   means for subdividing said parallel computer into two or more groups of interconnected processor units which groups do not interact with each other, said subdividing means comprising:
   means for selectively controlling access to each of said message packet communication lines, and
   means responsive to signals received by the control circuit from a host computer for setting said controlling means so as to prevent access to selected message packet communication lines.

2. The parallel computer of claim 1 wherein the processor units are interconnected in the form of a hypercube, each communication line establishes an interconnection between processor units along one dimension of the hypercube, and the controlling means selectively controls access to each of the dimensions of the hypercube, whereby portions of the hypercube may be subdivided into isomorphic units.

3. The parallel computer of claim 1 wherein the processor units are interconnected in the form of a hypercube, each communication line establishes an interconnection between processor units along one dimension of the hypercube, and the interconnecting means comprises:
   an array of inputs, equal in number to the dimensions of the hypercube, said inputs receiving signals via said communication lines from nearest neighbor processor units in the hypercube, an array of outputs, equal in number to the dimensions of the hypercube, said outputs transmitting signals via said communication lines to nearest neighbor processor units in the hypercube, logic means for connecting message packets received at said inputs to selected outputs, and means for establishing among the message packets received at the inputs a priority of access to a selected output, and the subdividing means comprises means for selectively prohibiting access to the outputs by denying to all message packets sufficient priority of access to a selected output.

4. The parallel computer of claim 1 wherein the processor units are interconnected in the form of a hypercube of n dimensions, the control circuit of each processor unit further comprising:

a first gating means having one signal input from a nearest neighbor processor unit in each dimension of the hypercube, means for controlling the gating means so as to be able to select as an output from the gating means a signal input from one or more nearest neighbor processor units of the hypercube, a second gating means having one signal output to a nearest neighbor processor units in each dimension of the hypercube, means for controlling the second gating means so as to be able to select as an output to the nearest neighbor processor units of the hypercube one of a plurality of input signals, a first of which is an output from the first gating means and a second of which is an output from the processor in the same processor unit as the control circuit, whereby signals from said processor or from selected nearest neighbor processor unit(s) may be broadcast via said second gating means to nearest neighbor processor units connected to said second gating means.

5. The parallel computer of claim 4 wherein the first gating means comprises means for selecting any one or more of the signal inputs from the nearest neighbor processor units and for forming a logical OR of said selected inputs.

6. The parallel computer of claim 5 wherein the second input signal to the second gating means is an instruction signal from the processor which is broadcast via the second gating means to the nearest neighbor processor units that are connected to the second gating means.

7. The parallel computer of claim 6 wherein instruction signals are received by the control circuit from a selected nearest neighbor processor unit through the output of the first gating means.

8. The parallel computer of claim 5 wherein the control circuit further comprises:

a third gating means having one signal input from a nearest neighbor processor unit in each dimension of the hypercube, means for controlling the third gating means so as to be able to select as an output from the gating means a signal input from one of the nearest neighbor processor units in the hypercube, a fourth gating means having one signal output which is provided as the second input to the second gating means, and means for controlling the fourth gating means so as to be able to select as an output one of a plurality of input signals, a first of which is the output of the third gating means and a second of which is an output from the processor in the same processor unit as the control circuit, whereby signals from said processor or from a selected nearest neighbor processor unit may be broadcast via the second gating means to nearest neighbor processor units connected to said second gating means.

9. The parallel computer of claim 8 wherein the second input signal to the second gating means is a synchronization signal from the processor which is broadcast via the second gating means to the nearest neighbor processor units of the hypercube that are connected to the second gating means and the second input signal to the fourth gating means is an instruction signal from the processor which is broadcast via the second gating means to the nearest neighbor processor units that are connected to the second gating means 10. The parallel computer of claim 9 wherein synchronization signals are received by the control circuit from nearest neighbor processor units through the output of the first gating means and instruction signals are received by the control circuit from the nearest neighbor processor units through the output of the third gating means.

11. The parallel computer of claim 4 wherein the second input signal to the second gating means is a synchronization signal from the processor which is broadcast via the second gating means to the nearest neighbor processor units that are connected to the second gating means.

12. The parallel computer of claim 11 wherein synchronization signals are received by the control circuit from nearest neighbor processor units through the output of the first gating means, whereby the processor can synchronize operations in processor units connected to the second gating means by broadcasting synchronization instructions to said processor units via the second gating means and monitoring the output of the first gating means for an appropriate response from said processor units.

13. A parallel computer comprising:

a plurality of processor units, each processor unit comprising a processor, a read/write memory, and a control circuit, an interconnection network for interconnecting the processor units, a plurality of host computers, and means for connecting the host computers to at least some of the processor units, each said control circuit of a processor unit comprising:

means for addressing the read/write memory of said processor unit in response to an address received from the processor of said processor unit and for reading information from said memory, a data cache for storing information read from the read/write memory, means connected to said data cache for routing data from one processor unit to another, means for routing instructions from one processor unit to another, means for testing if information stored by said data cache is a parallel instruction and for providing such parallel instruction to the instruction routing means if it is and for providing the information to the processor unit if it is not, and means for subdividing said parallel computer into two or more groups of interconnected processor units which groups do no interact with each other, said subdividing means comprising:
means for selectively controlling access to each of said message packet communication lines, and
means responsive to signals received by the control circuit from a host computer for setting said controlling means so s to prevent access to selected message packet communication lines.

14. The parallel computer of claim 13 wherein the processor units are interconnected in the form of a hypercube, a communication line establishes an interconnection between processor units along one dimension of the hypercube, and the control circuit of each processor unit selectively controls access to each of the communication lines along the dimensions of the hypercube, whereby portions of the hypercube may be subdivided into isomorphic units.

15. The parallel computer of claim 13 wherein the processor units are interconnected in the form of a hypercube, a communication line establishes an interconnection between processor units along one dimension of the hypercube, and the data routing means comprises:
an array of inputs equal in number to the dimensions of the hypercube, said inputs receiving signals via said communication lines from nearest neighbor processor units in the hypercube,
an array of outputs, equal in number to the dimension of the hypercube, said outputs transmitting signals via said communication lines to nearest neighbor processor units in the hypercube,
logic means for connecting message packets received at said inputs to selected outputs, and
means for establishing among the message packets received at the inputs a priority of access to a selected output, and
the subdividing means comprises mean for selectively prohibiting access to the outputs by denying to all message packets sufficient priority of access to a selected output.

16. The parallel computer of claim 13 wherein the processor units are interconnected in the form of a hypercube of n dimensions, the instruction routing means of each processor unit comprising:
a first gating means having one signal input from a nearest neighbor processor unit in each dimension of the hypercube,
means for controlling the gating means so as to be able to select as an output from the gating means a signal input from one or more nearest neighbor processor units of the hypercube,
a second gating means having one signal output to a nearest neighbor processor unit in each dimension of the hypercube,
means for controlling the second gating means so as to be able to select as an output to the nearest neighbor processor units of the hypercube one of a plurality of input signals, a first of which is an output from the first gating means and a second of which is an output from the processor in the same processor unit as the control circuit, whereby signals from said processor or from selected nearest neighbor processor unit(s) may be broadcast via said second gating means to nearest neighbor processor units connected to said second gating means.

17. The parallel computer of claim 16 wherein the first gating means comprises means for selecting any one or more of the signal inputs from the nearest neighbor processor units and for forming a logical OR of said selected inputs.

18. The parallel computer of claim 17 wherein synchronization signals are received by the control circuit from nearest neighbor processor units through the output of the first gating means, whereby the processor can synchronize operations in processor units connected to the second gating means by broadcasting synchronization instructions to said processor units via the second gating means and monitoring the output of the first gating means for an appropriate response from said processor units.

19. The parallel computer of claim 16 wherein the second input signal to the second gating means is a synchronization signal from the processor which is broadcast via the second gating means to the nearest neighbor processor units that are connected to the second gating means.

20. The parallel computer of claim 16 wherein the second input signal to the second gating means is a parallel instruction from the testing means which is broadcast via the second gating means to the nearest neighbor processor units that are connected tot he second gating means.

21. The parallel computer of claim 20 wherein instruction signals are received by the control circuit from a selected nearest neighbor processor unit through the output of the first gating means and provided to the data cache.

22. The parallel computer of claim 16 wherein the instruction rotating means further comprises:
a third gating means having one signal input from a nearest neighbor processor unit in each dimension of the hypercube,
means for controlling the third gating means so as to be able to select as an output from the gating means a signal input from one of the nearest neighbor processor units the hypercube.
a fourth gating means having one signal output which is provided as the second input to the second gating means, and
means for controlling the fourth gating means so as to be able to select as an output one of a plurality of input signals, a first of which is the output of the third gating means and a second of which is an output from the processor in the same processor unit as the control circuit, whereby signals from said processor or from a selected nearest neighbor processor unit may be broadcast via the second gating means to nearest neighbor processor units connected to said second gating means.

23. The parallel computer of claim 22 wherein the second input signal to the second gating means is a synchronization signal from the processor which is broadcast via the second gating means to the nearest neighbor processor units of the hypercube that are connected to the second gating means and the second input signal to the fourth gating means is a parallel instruction from the testing means which is broadcast via the second gating means to the nearest neighbor processor units that are connected to the second gating means.

24. The parallel computer of claim 23 wherein synchronization signals are received by the control circuit from nearest neighbor processor units through the output of the first gating means and instruction signals are received by the control circuit from a selected nearest neighbor processor units through the output of the third gating means and provided to the data cache.

25. In a multiprocessor comprising a plurality of interconnected processor units that is subdivided to form a separate processing group, a circuit for controlling signalling among the processor units in a processing group comprising at each processor unit;
- a first gating means having one signal input from each of a plurality of processor units to which the gating means is connected,
- means for controlling the first gating means so as to be able to select s an output from the gating means a signal input from one or more of said processor units,
- a second gating means having one signal output to each of a plurality of processor units to which the gating means is connected, and
- means for controlling the second gating means so as to be able to select as an output to the processor units one of a plurality of signals, one of which is an output from the first gating means.

26. The parallel computer of claim 25 wherein the first gating means comprises means for selecting any one or more of the signal inputs from the processor units to which the inputs are connected and for forming a logical OR of said selected inputs.

27. The parallel computer of claim 25 wherein the second input signal to the second getting means in a synchronization signal from the processor which is broadcast via the second gating means to the processor units that are connected to the second gating means.

28. The parallel computer of claim 27 wherein synchronization signals are received at the inputs to the first gating means from processor units to which the outputs of the second gating means are connected, whereby the processor can synchronize operations in processor units connected to the second gating means by broadcasting synchronization instructions to said processor units via the second gating means and monitoring the output of the first gating means for an appropriate response from said processor units.

29. The parallel computer of claim 25 wherein the second input signal to the second gating means is an instruction signal from the processor which is broadcast via the second gating means to the processor units that are connected to the second gating means.

30. The parallel computer of claim 29 wherein instruction signals are received by the control circuit from a selected processor unit through the output of the first gating means.

31. The parallel computer of claim 25 wherein the control circuit further comprises:
- a third gating means having one signal input from each of the plurality of processor units to which the first gating means is connected,
- means for controlling the third gating means so as to be able to select as an output from the gating means a signal input from one of said processor units,
- a fourth gating means having one signal output which is provided as the second input to the second gating means, and
- means for controlling the fourth gating means so as to be able to select as an output one of a plurality of input signals, a first of which is the output of the third gating means and a second of which is an output from the processor in the same processor unit as the control circuit, whereby signals from said processor or from a selected processor unit connected to an input to the third gating means may be broadcast via the second gating means to processor units connected to said second gating means.

32. The parallel computer of claim 31 wherein the second input signal to the second gating means is a synchronization signal from the processor which is broadcast via the second gating means to the processor units that are connected to the second gating means and the second input signal to the fourth gating means is an instruction signal from the processor which is broadcast via the second gating means to the processor units that are connected to the second gating means.

33. The parallel computer of claim 32 wherein synchronization signals are received at the inputs to the first gating means from processor units to which the outputs of the second gating means are connected and instruction signals are received by the control circuit from the said processor units through the output of the third gating means.

34. The circuit of claim 25 wherein the processor units are connected in the form of a hypercube of n dimensions, the first gating means has n inputs, one from each nearest neighbor processor unit in the hypercube and the second gating means has n outputs, one to each nearest neighbor processor unit in the hypercube.

35. A parallel computer comprising:
- A. a plurality of processor unit groups each comprising at least one processor unit, each processor unit generating messages for transfer to another processor unit, at least one processor unit generating a partition control signal;
- B. a message transfer network comprising a plurality of nodes and a plurality of communications links for interconnecting said nodes, each node comprising:
  i. a receiving circuit for receiving messages from the processor units of the associated processor unit groups;
  ii. an outgoing communications link identifier for identifying a communications link over which a received message is to be transmitted;
  iii. a coupler for coupling each message over the communications link identified by said outgoing communications link identifier; and
  iv. an inhibitor for inhibiting said coupler from transmitting messages over selected ones of said communications links in response to said partition control signal.

36. The parallel computer of claim 35 wherein the processor units are interconnected in the form of a hypercube of n dimensions, the communication links establish interconnections between processor units along the dimensions of the hypercube, and the message transfer network selectively controls access to each of the communication links along the dimensions of the hypercube, whereby portions of the hypercube may be subdivided into isomorphic units.

* * * * *